United States Patent
Hassan Hussein et al.

(10) Patent No.: US 11,533,157 B2
(45) Date of Patent: Dec. 20, 2022

(54) FULL DUPLEXING DOWNLINK AND UPLINK DIRECTIONS

(71) Applicant: Fraunhofer-Gesellschaft zur Förderung der angewandten Forschung e.V., Munich (DE)

(72) Inventors: Khaled Shawky Hassan Hussein, Erlangen (DE); Rudraksh Shrivastava, Fürth (DE); Thomas Heyn, Fürth (DE); Bernhard Niemann, Erlangen (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 388 days.

(21) Appl. No.: 16/683,793

(22) Filed: Nov. 14, 2019

(65) Prior Publication Data

US 2020/0145175 A1  May 7, 2020

Related U.S. Application Data

(63) Continuation of application No. PCT/EP2018/063175, filed on May 18, 2018.

(30) Foreign Application Priority Data

May 18, 2017 (EP) .................... 17171718

(51) Int. Cl.
*H04L 5/14* (2006.01)
*H04W 72/08* (2009.01)
*H04W 72/10* (2009.01)

(52) U.S. Cl.
CPC .......... *H04L 5/14* (2013.01); *H04W 72/082* (2013.01); *H04W 72/085* (2013.01); *H04W 72/10* (2013.01)

(58) Field of Classification Search
CPC .... H04L 5/14; H04W 72/082; H04W 72/085; H04W 72/10; H04W 72/121; H04W 72/1226; H04W 72/1231
See application file for complete search history.

(56) References Cited

U.S. PATENT DOCUMENTS

| | | |
|---|---|---|
| 9,131,524 B2 | 9/2015 | Gaal et al. |
| 2005/0015529 A1* | 1/2005 | Jung .................. G06F 11/2097 714/E11.08 |

(Continued)

FOREIGN PATENT DOCUMENTS

| | | |
|---|---|---|
| EP | 2815617 A1 | 12/2014 |
| EP | 2919411 A1 | 9/2015 |

(Continued)

OTHER PUBLICATIONS

HTC, "In-band full duplexing in NR", 3GPP TSG RAN WG1 #87, R1-1612756, Nov. 4, 2016, 3GPP server.

(Continued)

*Primary Examiner* — Kashif Siddiqui
(74) *Attorney, Agent, or Firm* — Novick, Kim & Lee PLLC; Jae Youn Kim

(57) ABSTRACT

Examples refer to communication networks between user equipment, UEs, and a base station BS. Examples refer to communication devices, such as UE(s) and/or BS(s). Full duplexing communications, FDC, may be used to reduce interferences between different UEs.

3 Claims, 15 Drawing Sheets

(56) References Cited

U.S. PATENT DOCUMENTS

| | | | |
|---|---|---|---|
| 2015/0078177 A1 | 3/2015 | Buckley et al. | |
| 2015/0327293 A1 | 11/2015 | Luo et al. | |
| 2015/0382375 A1* | 12/2015 | Bhushan | H04W 52/243 |
| | | | 370/252 |
| 2016/0242197 A1* | 8/2016 | Wang | H04L 5/14 |
| 2016/0301514 A1* | 10/2016 | Samdanis | H04W 52/14 |

FOREIGN PATENT DOCUMENTS

| | | |
|---|---|---|
| KR | 10-2017-0020813 A | 2/2017 |
| WO | 2015190663 A1 | 12/2015 |
| WO | 2016006779 A1 | 1/2016 |

OTHER PUBLICATIONS

LG Electronics, "New SID: Study on flexible and full duplex for NR", 3GPP TSG RAN #75, RP-170707, Mar. 7, 2017, 3GPP server.

Fujitsu, "Discussion on duplexing modes in NR, 3GPP TSG RAN WG1 #86bis", R1-1608925, Sep. 30, 2016, 3GPP server.

Jung Nam Ho, "Office Action for KR Application No. 10-2019-7037521", dated May 24, 2021, KIPO, Korea.

Goyal et al., Throughput and coverage for a mixed full and half duplex small cell network, 2016 IEEE International Conference on Communications (ICC), pp. 1-7.

\* cited by examiner

FULL DUPLEXING DOWNLINK AND UPLINK DIRECTIONS

CROSS-REFERENCE TO RELATED APPLICATIONS

This application is a continuation of copending International Application No. PCT/EP2018/063175, filed May 18, 2018, which is incorporated herein by reference in its entirety, and additionally claims priority from European Application No. 17171718.4, filed May 18, 2017, which is also incorporated herein by reference in its entirety.

BACKGROUND OF THE INVENTION

Examples refer to communication networks between user equipments, UEs, and a base station, BS.

Examples refer to communication devices, such as UE(s) and/or BS(s) and systems comprising UEs and BSs.

Communications networks may need transmissions and receptions between user equipment, UEs, and a base station, BS, in uplink, UL, and/or downlink, DL.

Interferences may be generated between transmissions and/or receptions of different UEs, with the same BS, for example.

There may arise the problem of obtaining a Cell-Specific Dynamic UL/DL reconfiguration and resource allocation. There may arise the problem of reducing the total resources as they are consumed in the virtual frames; hence reducing the overall cell-sum throughput. In general terms, in known technology it is only possible a very selective neighboring cells with certain UL/DL traffic conditions and interference situation.

In TDD-LTE according to known technology, the 3GPP community provides frame structures that provide flexibility in allocating UL/DL resources. Hence, each base station (BS) or evolved node (eNB) is flexibly/or coordinately selecting one of the following 7 different UL/DL configuration modes (up to release 14) presented in Table 1:

TABLE 1

Uplink-downlink allocations

| Con-figur-ation | Switch-point period-icity | Subframe number | | | | | | | | | | DL:UL |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 2:3 |
| 1 | 5 ms | D | S | U | U | D | D | S | U | U | D | 3:2 |
| 2 | 5 ms | D | S | U | D | D | D | S | U | D | D | 4:1 |
| 3 | 10 ms | D | S | U | U | U | D | D | D | D | D | 7:3 |
| 4 | 10 ms | D | S | U | U | D | D | D | D | D | D | 8:2 |
| 5 | 10 ms | D | S | U | D | D | D | D | D | D | D | 9:1 |
| 6 | 5 ms | D | S | U | U | U | D | S | U | U | D | 3:3:2:2 |

However, the interference due to such a dynamically switching between different configurations needs to be managed. The introduced interference can be, first, cross-slot interference which arises due to having transmission in different directions at the same time (See FIG. 13, referring to known technology and showing a cross-slot interference and signal transmission in cellular network). Second, a uniform directional interference, which usually occurs due to transmissions in same UL/DL directions.

The challenges here are to mitigate this interference using one or of the following techniques:

Accurate Coordination and Synchronization: frame and UL/DL configuration mode, using, e.g., Inter-cell Interference coordination (ICIC) techniques;
Scheduling dependent interference mitigation;
Cell clustering interference mitigation;
Power control and silent sub-frames.

Another concept for enhancing resource management via virtual cell formation is to use resources from more than one BS (e.g., eNB). In this case, it can potentially be used to resolve the pseudo congestion problem due to overloading the main cell with one direction than the other (UL or DL). Hence, a multi-connectivity (or dual connectivity) can be used to acquire resources from neighboring eNBs in opposite transmission duplexing directions. See FIG. 14 (regarding virtual-cell/virtual-frame concept and UL/DL multi-connectivity) for more details.

In known technology, several solutions have been proposed:

Virtual frames with selected resources from the neighbor cells;
Clustering users at cell edges to be served with special resources;
Dual/multi-connectivity within the same wireless standard (from different cells) or across different wireless standards;
3GPP Dynamic TDD frame structure/frame reconfigurations/TDD uplink/special subframes/full-flexible TDD (with custom frame configurations);
Cellular interference mitigation, e.g. and not limited to, Power control and silent sub-frames, interference Scheduling dependent techniques, and cell clustering interference mitigation mechanisms;
Full duplex communication on the top of TDD/FDD or full duplex communication (FDC) individually;
Self-interference mitigation techniques in FDC, e.g. and not limited to, passive, active analog, and active digital.

SUMMARY

An embodiment may have a method having the following full duplex communication, FDC, procedure: pairing a first user equipment, UE, or a first group of UEs, with a second UE or a second group of UEs; and defining dedicated resources, for a communication between a base station, BS, and the first and second UEs or the first and second groups, so as to full-duplex the uplink, UL, direction, from the first UE or group to the BS, and the downlink, DL, direction, from the BS to the second UE or group, or vice versa, the method having: deciding whether to perform the FDC procedure on the basis of at least one parameter having at least one component based on at least one of: expected services; and/or quality-of-service, QoS; and/or quality-of-experience, QoE; and/or switching points based on system throughput, outage probability, and/or geographic positions of the users.

Another embodiment may have a method having: pairing a first user equipment, UE, or a first group of UEs, with a second UE or a second group of UEs; and defining dedicated resources, for a communication between a base station, BS, and the first and second UEs or the first and second groups, so as to full-duplex the uplink, UL, direction, from the first UE or group to the BS, and the downlink, DL, direction, from the BS to the second UE or group, or vice versa, the method having: identifying the dedicated resources and/or selecting the first and second UEs or groups from a plurality of UEs or groups on the basis of assigned priority values, so as to selectively increase the uplink and/or downlink dedicated resources for higher priority communications.

Still another embodiment may have base station, BS, configured to: operate in a full duplex communication, FDC, by using dedicated resources to perform communications, simultaneously, in uplink, UL, with a first user equipment, UE, or cluster of UEs, and in downlink, DL, with a second user equipment, UEs, or second cluster of UEs; and decide whether to perform the FDC communication on the basis of at least one parameter having at least one component based on at least one of: expected services; quality-of-service, QoS; quality-of-experience, QoE; switching points based on system throughput, outage probability, and/or geographic positions of the users.

Another embodiment may have a base station, BS, configured to: use dedicated resources to perform communications, simultaneously, in uplink, UL, with a first user equipment, UE, or cluster of UEs, and in downlink, DL, with a second user equipment, UEs, or second cluster of UEs; and identify the dedicated resources and/or select the first and second UEs or groups from a plurality of UEs or groups on the basis of assigned priority values, so as to selectively increase the uplink and/or downlink dedicated resources for higher priority communications.

Another embodiment may have a user equipment, UE, for performing uplink and downlink operations, the UE being configured for: coupling with a counterpart UE, or a group of counterpart UEs for a full duplex communication, FDC, with a base station, BS; and performing uplink operations while the counterpart UE or group is performing downlink operations in correspondence of dedicated resources, wherein the UE is configured to receive from the BS a signalling regarding whether to operate in FDC on the basis of at least one parameter having at least one component based on at least one of: expected services; quality-of-service, QoS; quality-of-experience, QoE; switching points based on system throughput, outage probability, and/or geographic positions of the users.

Another embodiment may have a user equipment, UE, for performing uplink and downlink operations, the UE being configured for: coupling with a counterpart UE, or a group of counterpart UEs for a full duplex communication, FDC, with a base station, BS; and performing uplink operations while the counterpart UE or group is performing downlink operations in correspondence of dedicated resources, wherein the UE is configured to receive from the BS a signalling identifying the dedicated resources and/or selecting the first and second UEs or groups from a plurality of UEs or groups on the basis of assigned priority values, so as to selectively increase the uplink and/or downlink dedicated resources for higher priority communications.

Another embodiment may have a non-transitory digital storage medium having stored thereon a computer program for performing a method having the following full duplex communication, FDC, procedure: pairing a first user equipment, UE, or a first group of UEs, with a second UE or a second group of UEs; and defining dedicated resources, for a communication between a base station, BS, and the first and second UEs or the first and second groups, so as to full-duplex the uplink, UL, direction, from the first UE or group to the BS, and the downlink, DL, direction, from the BS to the second UE or group, or vice versa, the method having: deciding whether to perform the FDC procedure on the basis of at least one parameter having at least one component based on at least one of: expected services; and/or quality-of-service, QoS; and/or quality-of-experience, QoE; and/or switching points based on system throughput, outage probability, and/or geographic positions of the users, when said computer program is run by a computer.

In accordance to examples, there is provided a method comprising the following full duplex communication, FDC, procedure:

pairing a first user equipment, UE, or a first group of UEs, with a second UE or a second group of UEs; and defining dedicated resources, for a communication between a base station, BS, and the first and second UEs or the first and second groups, so as to full-duplex the uplink, UL, direction, from the first UE or group to the BS, and the downlink, DL, direction, from the BS to the second UE or group, or vice versa, the method comprising:

deciding whether to perform the FDC procedure on the basis of at least one parameter having at least one component based on at least one of:

expected services;

quality-of-service, QoS;

quality-of-experience, QoE;

switching points based on system throughput, outage probability, and/or geographic positions of the users.

The at least one parameter may have at least one component based on at least one of:

measurements relating to power consumption;

relative locations of BS and all the UEs;

used signal to interference plus noise ratio, SINR, or interference to noise ratio, INR at each UE;

application/service/traffic/traffic prediction-priority type;

traffic prediction;

degree of traffic asymmetry;

cyclic redundancy code, CRC, calculations.

In accordance to examples, there is provide a method comprising:

pairing a first user equipment, UE, or a first group of UEs, with a second UE or a second group of UEs; and defining dedicated resources, for a communication between a base station, BS, and the first and second UEs or the first and second groups, so as to full-duplex the uplink, UL, direction, from the first UE or group to the BS, and the downlink, DL, direction, from the BS to the second UE or group, or vice versa, the method comprising:

identifying the dedicated resources and/or selecting the first and second UEs or groups from a plurality of UEs or groups on the basis of assigned priority values, so as to selectively increase the uplink and/or downlink dedicated resources for higher priority communications.

The method may be further comprising transmitting from the UE at least one of the following data:

data regarding the resources requested;

data regarding the priority of the communication;

zonal data;

data regarding traffic.

The method may be further comprising transmitting from the BS a switching signalling to all the UEs which are to change the operation to FDC.

The method may be further comprising sending a signalling to the UEs informing them about an FDC switching control information, wherein the UE signals the following information:

UE Priority type; and/or

UE Traffic priority, predicted traffic priority; and/or

UE zonal and positioning information.

The method may be further comprising, based on the user priority type, traffic priority, and UE zonal and positioning information, to switch some/all users to FDC communication based on at least one of the following conditions:
- if there is a UE pair separated enough to reduce the mutual UE-UE interference;
- if the system throughput will increase compared to legacy TDD/FDD and/or
- spatial multiplexing in TDD/FDD.

The method may be further comprising saving throughput switching points and storing them in a lookup table.

The method may be further comprising:
coupling the first and the second UEs or groups of UEs in real time at least on the basis of the urgency of the communication.

The method may be further comprising:
coupling the first and the second UEs or groups of UEs in real time at least on the basis of the quality of experience.

The method may be further comprising:
coupling the first and the second UEs or groups of UEs in real time at least on the basis of the reciprocal distance between the UEs or clusters.

The method may be further comprising:
coupling the first and the second UEs or groups of UEs in real time at least on the basis of the quality-of-service.

The method may be further comprising:
coupling the first and the second UEs or groups of UEs in real time at least on the basis of a parameter bounded to the expected, estimated and/or calculated interference between the UEs or clusters.

The method may be further comprising a self-interference mitigation mechanism at the BS.

The dedicated resources may comprise at least one or more spatial channels.

The dedicated resources may comprise at least one or more power intensity levels.

The dedicated resources may comprise at least one or more code dimensions.

The dedicated resources may comprise a combination of one or more time slots, one or more frequency bands, one or more spatial channels, one or more power intensity levels, and one or more code dimensions.

The method may be further comprising:
identifying the dedicated resources on the basis of a parameter having a component associated to the measured and/or estimated and/or predicted interference between the UEs or groups and/or the quality-of-service, QoS, and/or the quality-of-experience, QoE, so as to pair the UEs or groups to reduce interferences and/or increase the QoS.

The method may be further comprising:
selecting the first and second UEs or groups from a plurality of UEs on the basis of a parameter having a component associated to the measured and/or estimated and/or predicted interference between the UEs or groups and/or the quality-of-service, QoS, and/or the quality-of-experience, QoE, so as to pair the UEs or groups to reduce interferences and/or increase the QoS.

The method may be further comprising:
identifying the dedicated resources and/or selecting the first and second UEs or groups from a plurality of UEs on the basis of a parameter having a component associated to the quality-of-experience, QoE, so as to pair the UEs or groups to reduce interferences and/or increase the QoS.

The method may be further comprising:
identifying the dedicated resources and/or selecting the first and second UEs or groups from a plurality of UEs on the basis of a parameter having a component associated to the measured and/or estimated and/or predicted interference between the UEs or groups, so as to pair the UEs or groups to reduce interferences and/or increase the QoS.

The method may be further comprising:
identifying the dedicated resources and/or selecting the first and second UEs or groups from a plurality of UEs on the basis of the quality-of-service, QoS, so as to pair the UEs or groups to reduce interferences and/or increase the QoS.

The method may be further comprising:
identifying the dedicated resources and/or selecting the first and second UEs or groups from a plurality of UEs on the basis of a count of the quantity of received/transmitted good frames.

The method may be further comprising:
identifying the dedicated resources and/or selecting the first and second UEs or groups from a plurality of UEs by measuring the signal to interference plus noise ratio, SINR.

The method may be further comprising:
identifying the dedicated resources and/or selecting the first and second UEs or groups from a plurality of UEs by measuring the interference to noise ratio, INR.

The method may be further comprising:
identifying the dedicated resources and/or selecting the first and second UEs or groups from a plurality of UEs by measuring the background noise.

The method may be further comprising:
identifying the dedicated resources and/or selecting the first and second UEs or groups from a plurality of UEs by measuring the background interference.

The method may be further comprising:
selecting the first and second UEs or groups from a plurality of UEs or groups on the basis of a parameter having a component associated to a reciprocal distance between the UEs or groups, so as to pair the first and the second UEs if the distance between the first and the second UEs or groups is greater than a threshold.

The method may be further comprising:
generating the first and second groups from a plurality of UEs on the basis of at least one of reciprocal distance between UEs, UL/DL resource assignment, and traffic requirements.

The method may be further comprising:
in case of a UE requesting an urgent communication, retrieving a UE or a group of UEs to be paired to the requesting UE.

The method may be further comprising:
detecting the position of a UE using a time of arrival, TOA, technique.

The method may be further comprising:
detecting the position of a UE using an angle of arrival, AOA, technique.

The method may be further comprising:
detecting the position of a UE using an phase difference of arrival, PDOA, technique.

The method may be further comprising:
detecting the position of a UE using a time difference of arrival, TDOA, technique.

The method may be further comprising operating in multi-connectivity.

The method may be further comprising:
deciding to operate in multi-connectivity as a fall-back in case of decision of non-operating in FDC.

A base station, BS, may be configured to:
operate in a full duplex communication, FDC, by using dedicated resources to perform communications, simultaneously, in uplink, UL, with a first user equipment, UE, or cluster of UEs, and in downlink, DL, with a second user equipment, UEs, or second cluster of UEs; and
decide whether to perform the FDC communication on the basis of at least one parameter having at least one component based on at least one of:
expected services;
quality-of-service, QoS;
quality-of-experience, QoE;
switching points based on system throughput, outage probability, and/or geographic positions of the users.

A base station, BS, may be configured to:
use dedicated resources to perform communications, simultaneously, in uplink, UL, with a first user equipment, UE, or cluster of UEs, and in downlink, DL, with a second user equipment, UEs, or second cluster of UEs; and
identify the dedicated resources and/or select the first and second UEs or groups from a plurality of UEs or groups on the basis of assigned priority values, so as to selectively increase the uplink and/or downlink dedicated resources for higher priority communications The BS may be configured to:
couple the first and the second UEs or clusters of UEs in real time on the basis of the reciprocal distance between the UEs or clusters, the urgency of the communication, the quality-of-service, the quality of experience, and/or a parameter bounded to the expected, estimated and/or calculated interference between the UEs or clusters.

The BS may be configured to:
schedule the communications with the first and second UEs or clusters so as to identify dedicated resources for a simultaneous communication, on the basis of a parameter associated to the interference between the transmissions, the positions of the UEs or clusters, and/or a priority value associated to the transmission.

The BS may be configured to:
generate the first cluster and/or the second cluster, each cluster comprising UEs within a distance threshold or UEs selected on the basis of UL/DL resource assignment or traffic requirements, and
communicate with UEs of the first and/or second cluster simultaneously.

The BS may be configured to:
select and/or deselect a multi-connectivity mode on the basis of a parameter associated to the interference, the positions of the UEs or clusters, the quality-of-service, the quality-of-experience, and/or a priority value associated to the transmissions.

The BS may be configured to:
perform interference measurements and/or positional measurements and/or calculations of the distances between the first and the second UEs or clusters.

A user equipment, UE, for performing uplink and downlink operations, the UE may be configured for:
coupling with a counterpart UE, or a group of counterpart UEs for a full duplex communication, FDC, with a base station, BS; and
performing uplink operations while the counterpart UE or group is performing downlink operations in correspondence of dedicated resources,
wherein the UE is configured to receive from the BS a signalling regarding whether to operate in FDC on the basis of at least one parameter having at least one component based on at least one of:
expected services;
quality-of-service, QoS;
quality-of-experience, QoE;
switching points based on system throughput, outage probability, and/or geographic positions of the users.

A user equipment, UE, for performing uplink and downlink operations, may be configured for:
coupling with a counterpart UE, or a group of counterpart UEs for a full duplex communication, FDC, with a base station, BS; and
performing uplink operations while the counterpart UE or group is performing downlink operations in correspondence of dedicated resources,
wherein the UE is configured to receive from the BS a signalling identifying the dedicated resources and/or selecting the first and second UEs or groups from a plurality of UEs or groups on the basis of assigned priority values, so as to selectively increase the uplink and/or downlink dedicated resources for higher priority communications.

A non-transitory storage unit which stores instructions, which, when executed by a processor, cause the processor to perform one of the methods above or below.

According to an aspect, there is provided a method comprising:
pairing a first user equipment, UE, or a first group (cluster) of UEs, with a second UE or a second group (cluster) of UEs; and
defining dedicated resources, for a communication between a base station, BS and the first and second UEs,
so as to full-duplex the uplink, UL, direction, from the first UE or group to the BS, and the downlink, DL, direction, from the BS to the second UE or group, or vice versa.

For example, while the first UE or group transmits data (UL), the second UE or group receives data (DL), hence, reducing the interferences between the UEs or the groups.

The dedicated resources (or resource blocks, RBs) may be defined by at least one of or a combination of one or more time slots, one or more frequency bands, one or more spatial channels, one or more power intensity levels, and one or more code dimensions.

Hence, a dedicated resource may be shared by different UEs in UL or DL, so as to maximize the communications that may be performed simultaneously.

According to an aspect, a method may comprise identifying the dedicated resources and/or selecting the first and second UEs or groups from a plurality of UEs on the basis of a parameter having a component associated to the measured and/or estimated and/or predicted interference between the UEs or groups and/or the quality-of-service, QoS, and/or quality-of-experience, QoE, so as to pair the UEs or groups to reduce interferences and/or increase the QoS and/or QoE.

Accordingly, it is possible to determine whether there are the conditions for full duplex communication (FDC) or not. It is possible to easily and automatically derive which dedicated resources are most suitable. It is possible to easily and automatically pair different UEs or groups (clusters) with each other.

According to an aspect, a method may comprise selecting the first and second UEs or groups from a plurality of UEs or groups on the basis of a parameter having a component associated to a reciprocal distance between the UEs or groups, so as to pair the first and the second UEs if the distance between the first and second UEs or groups is greater than a threshold.

Therefore, it is possible to couple with each other the most suitable UEs or clusters (e.g., those which are at the greater distance, so as to minimize the interference, for example).

According to an aspect, a method may comprise identifying the dedicated resources and/or selecting the first and second UEs or groups from a plurality of UEs or groups on the basis of assigned priority values, so as to selectively increase the uplink and/or downlink dedicated resources for higher priority communications.

Therefore, it is possible to couple different UEs or groups which have greater priority first, hence increasing the reliability for more important communications.

According to an aspect, a method may comprise operating in multi-connectivity. For example, the method may comprise performing a cooperation between the BS with a further BS so as control a second pairing of the second UE or group with a third UE or third group of UEs, so as to define, in a second dedicated resource, a second full duplex communication between the further BS in UL from the second UE or group and in DL to the third UE or group or vice versa.

Accordingly, it is possible to reduce the burden for one BS in case another BS may assume some payload. Notably, the inventive method above is perfectly compliant to the multi-connectivity techniques.

According to an aspect, a BS may be configured to perform communications, simultaneously (e.g., at the same frequency band), in uplink, UL, with a first user equipment, UE, or cluster of UEs, and in downlink, DL, with a second user equipment, UEs, or second cluster of UEs.

Accordingly, the interferences between the UEs (e.g., UEs of different groups) may be reduced.

According to an aspect, a BS may be configured to couple the first and the second UEs or clusters of UEs (e.g., in real time) on the basis of the reciprocal distance between the UEs or clusters, the urgency of the communication, the quality-of-service QoE, the QoS, and/or a parameter bounded to the expected, estimated and/or calculated interference between the UEs or clusters.

Accordingly, it is possible to intelligently determine whether a communication shall be performed with FDC. The distance between two UEs or clusters is a parameter that may provide much information on the possibility of occurring interference, noise, collisions between different transmissions.

According to an aspect, a BS may be configured to schedule the communications with the first and second UEs so as to identify a dedicated resource, for a simultaneous communication, on the basis of a parameter associated to the interference between the transmissions, the positions of the UEs or clusters, and/or a priority value associated to the transmission.

By performing a scheduling, the most adapted dedicated resources may be determined and/or signalled to the UEs for FDC.

According to an aspect, a BS may be configured to communicate to an additional BS so as to perform a multi-connectivity mode for an uplink and/or a downlink with the second UE.

Hence, it is possible to perform a takeover of some payload for relieving a first BS from excessively high payload.

The BS may be, for example, an evolved node (eNB), a gNB (using the terminology of 5G) or, in general, a g/eNB. It is also possible to use a coordinator/centralized controller or any intelligent function implemented in a hybrid way partly centralized and partly distributed.

According to an aspect, a BS may be configured to define (create, generate) the first cluster (group) and/or the second cluster (group), each cluster comprising UEs within a distance threshold, or UEs selected on the basis of UL/DL resource assignment or traffic requirements, and communicate with UEs of the first and/or second cluster simultaneously.

Accordingly, the determination of which UE is assigned to which cluster is rendered easy.

According to an aspect, a BS may be configured to select and/or deselect a multi-connectivity mode on the basis of a parameter associated to the interference between the transmissions, the positions of the UEs or clusters, the quality-of-service, quality-of-experience, and/or a priority value associated to the transmissions.

Therefore, the multi-connectivity mode is selected when needed and on the basis of criteria which permit to easily determine the necessity or advantageousness of the multi-connectivity mode.

According to an aspect, a BS may be configured to perform interference measurements and/or positional measurements and/or calculations of the distances between the first and the second UEs or clusters.

Accordingly, it is possible to determine which are the best UEs and/or groups (clusters) for the purpose of pairing with each other.

According to an aspect, a user equipment, UE, may be for performing uplink and downlink operations (e.g., communications, such as transmissions/receptions). The UE may be configured for: coupling with a counterpart UE, or a group of counterpart UEs for performing a full duplex communication with a base station, BS; and performing uplink operations while the counterpart UE or group is performing downlink operations in correspondence of a dedicated resource and vice versa.

Accordingly, the UE (or a group to which the UE takes part) may transmit to the BS while another UE (or a group to which the UE or the group is coupled to) may perform a reception from the same BS.

According to an aspect, it is possible to generate the first and second groups from a plurality of UEs on the basis of the mutual distance, and/or the UL/DL resource assignment or traffic requirements.

Accordingly, it is possible to create the groups (clusters) with UEs which share same or similar properties, e.g., a particular assignment or requirement. In some examples, the UEs in the same group use different spatial channels.

According to an aspect, a user equipment, UE, may be configured to:
  determine measurements associated to the performance, the interference, the position, the distance with other UEs or groups and/or a base station, BS, and/or
  provide data associated to the measurements to be used to calculate a parameter for defining the scheduling of the uplink and/or downlink.

Accordingly, the UE may provide data to the BS which permit to decide whether to select a FDC or not. Therefore, the BS does not need to take all the measurements of its own.

According to an aspect, there is provided a non-transitory storage unit which stores instructions, which, when executed by a processor, cause the processor to:
- pair a first user equipment, UE, or a first group of UEs, and a second UE or a second group of UEs; and
- define dedicated resources, for a full duplex communication between a base station, BS, in uplink from the first UE or group, and in downlink to the second UE or group, or vice versa.

Accordingly, a reduction of interferences between UEs is reduced: while some UEs transmit, other UEs receive.

According to an aspect there is provided, in an Internet of Things (IoT) scenario, a communication in which at least one of the UEs is a IoT device or a communication device connected to a IoT device.

According to an aspect, there is provided a system comprising at least one BS. The system may comprise at least two UEs (or at least two groups of UEs).

BRIEF DESCRIPTION OF THE DRAWINGS

Embodiments of the present invention are now described in further detail with reference to the accompanying drawings, in which.

DETAILED DESCRIPTION OF THE INVENTION

A plurality of details is set forth to provide a more thorough explanation of embodiments of the present invention. However, it is apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Figure 1:
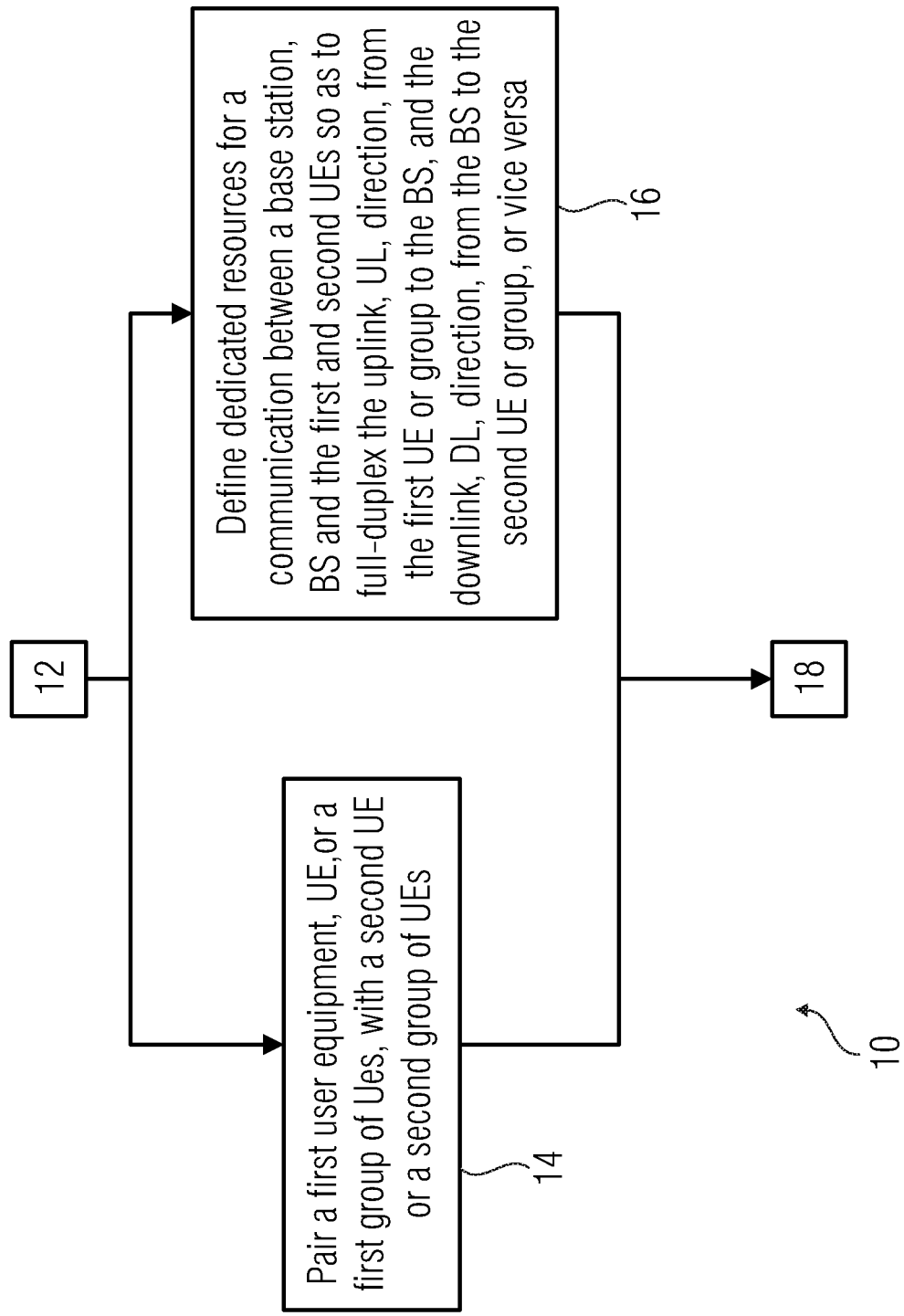
FIG. 1 shows a method according to an aspect of the invention.

FIG. 1 shows a method 10. The method 10 may enable full duplexing in a network (e.g., Evolving 5G Network). The method 10 may start at step 12 and may comprise a step 14 of pairing (associating) a first user equipment; (UE) with a second UE (for example, chosen among a plurality of UEs). The method 10 may also comprise a step 16 of defining a dedicated resources (e.g., a resource block, RB) for a communication (e.g., full duplex communication, FDC) between a base station (BS) and the UEs. The communication may be performed in uplink (UL) from the first UE to the BS, and in downlink (DL) from the BS to the second UE. The operation at step 14 and/or at step 16 may be performed by the BS, by a network coordinator, by a master node or master UE, by a scheduler, for example. While steps 14 and 16 are represented as parallel, they may be performed in sequence. Each UE may be paired (associated) to a plurality of UEs. The UEs may be grouped into groups or clusters. The UEs of a cluster may be paired with the UEs of another cluster (hence defining a pairing or association between different clusters). The clusters may be generated according to specific criteria, e.g., so as to group UEs which share a particular requirement, assignment, or property (e.g., the distance being below a predetermined threshold, a low mutual interference, or the necessity of performing urgent communications). The method may end at step 18. A signalling procedure for communicating which are the clusters, and/or the coupled UEs and/or the dedicated resources chosen for the full duplex communication may be provided. The method 10 may be repeated (e.g., iterated) for a plurality of UEs and/or for a plurality of dedicated resources to be allocated. UL and DL communications may be performed, for example, at step 18.

The BS may be, for example, an evolved node (eNB), a gNB (using the terminology of 5G) or, in general, a g/eNB. It is also possible to use a coordinator/centralized controller or any intelligent function implemented in a hybrid way partly centralized and partly distributed.

The communications may be performed using a scheduling. The scheduling may provide the transmission of periodical frames.

Time slots may be assigned to different UEs or groups of UEs and/or to the BS, e.g., for UL and/or for DL transmissions. Each time slot may be a dedicated resource which is assigned to a particular UE or group of UEs. Frequency bands (e.g., in different time slots) may be assigned to different UEs or groups of UEs and/or to the BS, e.g., for UL and/or for DL transmissions. Each frequency band may be a dedicated resource which is assigned to a particular UE or group of UEs. Spatial channels (e.g., in different time slots and/or at different frequency bands) may be assigned to different UEs or groups of UEs and/or to the BS, e.g., for UL and/or for DL transmissions. Each spatial channel may be a dedicated resource which is assigned to a particular UE or group of UEs. Power levels (e.g., in different time slots and/or at different frequency bands and/or in different spatial channels) may be assigned to different UEs or groups of UEs and/or to the BS, e.g., for UL and/or for DL transmissions. Each power level may be a dedicated resource which is assigned to a particular UE or group of UEs. Code dimensions (e.g., in different time slots and/or at different frequency bands and/or in different spatial channels and/or with different power levels) may be assigned to different UEs or groups of UEs and/or to the BS, e.g., for UL and/or for DL transmissions. Each code dimension may be a dedicated resource which is assigned to a particular UE or group of UEs. Any combination of time slots, frequency bands, spatial channels, power levels, and codes may be a dedicated resource which may be assigned to a particular UE or group of UEs. Other dimensions may be used.

The full duplex communications (FDCs) may imply the use of the same time slot and the same frequency band with the same for the communications between one BS and two different UEs (or clusters) at different directions. Accordingly, it is possible to full-duplex the uplink, UL, direction, from the first UE or group to the BS, and the downlink, DL, direction, from the BS to the second UE or group, or vice versa.

The full duplex communication may comprise sending a bi-directional transmission (e.g., a message) and performing a function aimed at cancelling (or at least reducing) the induced self-interference (e.g., at each transceiver). Self-interference at the base station may be reduced by using self-interference mitigation mechanisms. Intra-group UE-to-UE interference may be reduced using a wider separation distance between UEs. Different UEs in the same group may transmit, for example, on different spatial channels.

Figure 2:
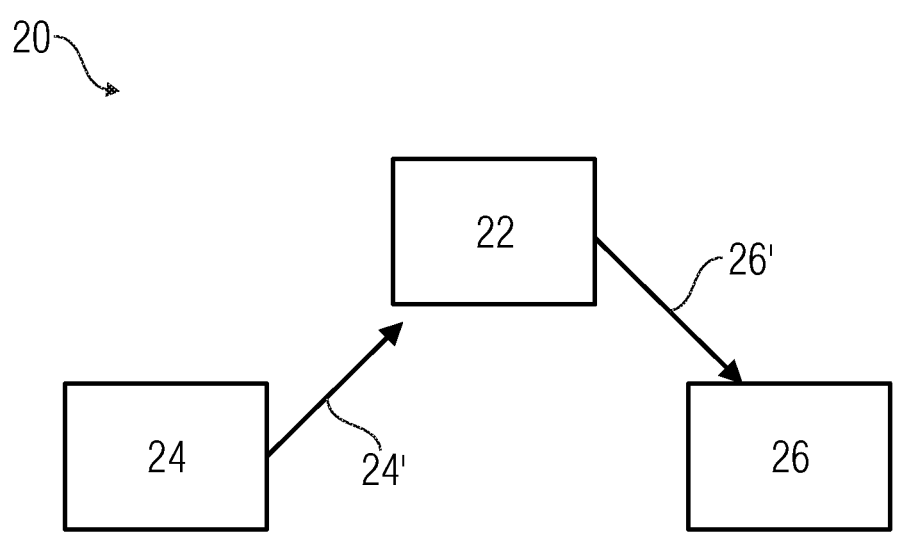
FIGS. 2-5 show examples of communication systems according to an aspect of the invention.

FIG. 2 shows a system 20, which may be, for example, a communication system between a BS 22 and the UEs 24 and 26. The system 20 may perform the method 10. The UEs 24 and 26 may be, for example, mobile phones, smartphones, mobile/portable terminals, mobile/portable computers, tablets, and so on. At least one of the UEs 24 and 26 may be IoT devices or communication devices connected to IoT devices. The UEs 24 and 26 may be paired (associated) to each other: there is at least one dedicated resource in which the UE 24 transmits data (e.g., it performs a UL) and the UE 26 receives data (e.g., operates in DL). In some examples, the UEs 24 and 26 are not necessarily alone: they may be part of groups (clusters) which may comprise other UEs. The UEs in the same group may transmit/receive simultaneously, e.g., at the same frequency in the same time slot.

The system 20 may provide a communication under a standard for mobile communications, such as 3rd Generation Partnership Project (3GPP), 4G, 5G, long term evolution (LTE), and so on. The communication may be according to universal mobile telecommunications system (UMTS) terrestrial radio access network (UTRAN) or an evolved UTRAN (eUTRAN). The communications may be wireless. The communications may comprise time division duplex (TDD) transmissions (UL and/or DL transmissions). The communications may comprise frequency division duplex (FDD) transmissions (UL and/or DL transmissions). The base station may be an evolved node (eNB), a gNB (using the terminology of 5G) or, in general, a g/eNB.

A dedicated resource shared by two UEs or groups of UEs may be, for example, a time slot. It is possible, for example, to operate in TDD. The time slot may be simultaneously used by both the UEs 24 and 26. The frequency band of the communications 24' and 26' may be the same. However, no collision occurs: while the UE 24 is operating in UL (24'), the UE 26 is operating in DL (26'). The UEs 24 and 26 may be coupled to each other if they fulfil criteria (e.g., reciprocal distance over a distance threshold, mutual interference below an interference threshold, satisfactory quality-of-service, QoS, and/or QoS, and so on) which permit to perform the UL and DL operations at the same dedicated resource. The fulfillment of the criteria may be determined in real time, e.g., in feedback, by measurements and/or estimations performed, for example, on distances, positions, physical magnitudes, interference data, QoS, and so on.

The BS 22, which is capable of operating in full duplex mode (FDM), may receive data from the UE 24 and transmit data to the UE 26 simultaneously and in the same frequency band. The time slot may be, for example, defined during a scheduling activity. The scheduling activity may be defined by the BS.

A dedicated resource (resource block, RB) shared by two UEs or groups of UEs may be, for example, a frequency band. It is possible to operate in FDD. Notably, also the frequency band of the communications 24' and 26' may be the same. However, no collision occurs: while the UE 24 is operating in UL (24'), the UE 26 is operating in DL (26'). The BS 22, which is capable of operating in FDM, may receive data from the UE 24 and transmit data to the UE 26 simultaneously and at the same frequency band. The frequency band may be, for example, defined during a scheduling activity. The scheduling activity may be defined by the BS.

When a dedicated resource is defined, a particular time slot, and/or a particular communication frequency, and/or a particular spatial channel and/or a particular power level and/or a particular code dimension may be defined. By sharing the same resources in different directions (UL and DL), the payload may be increased and the interferences may be reduced.

Figure 3:
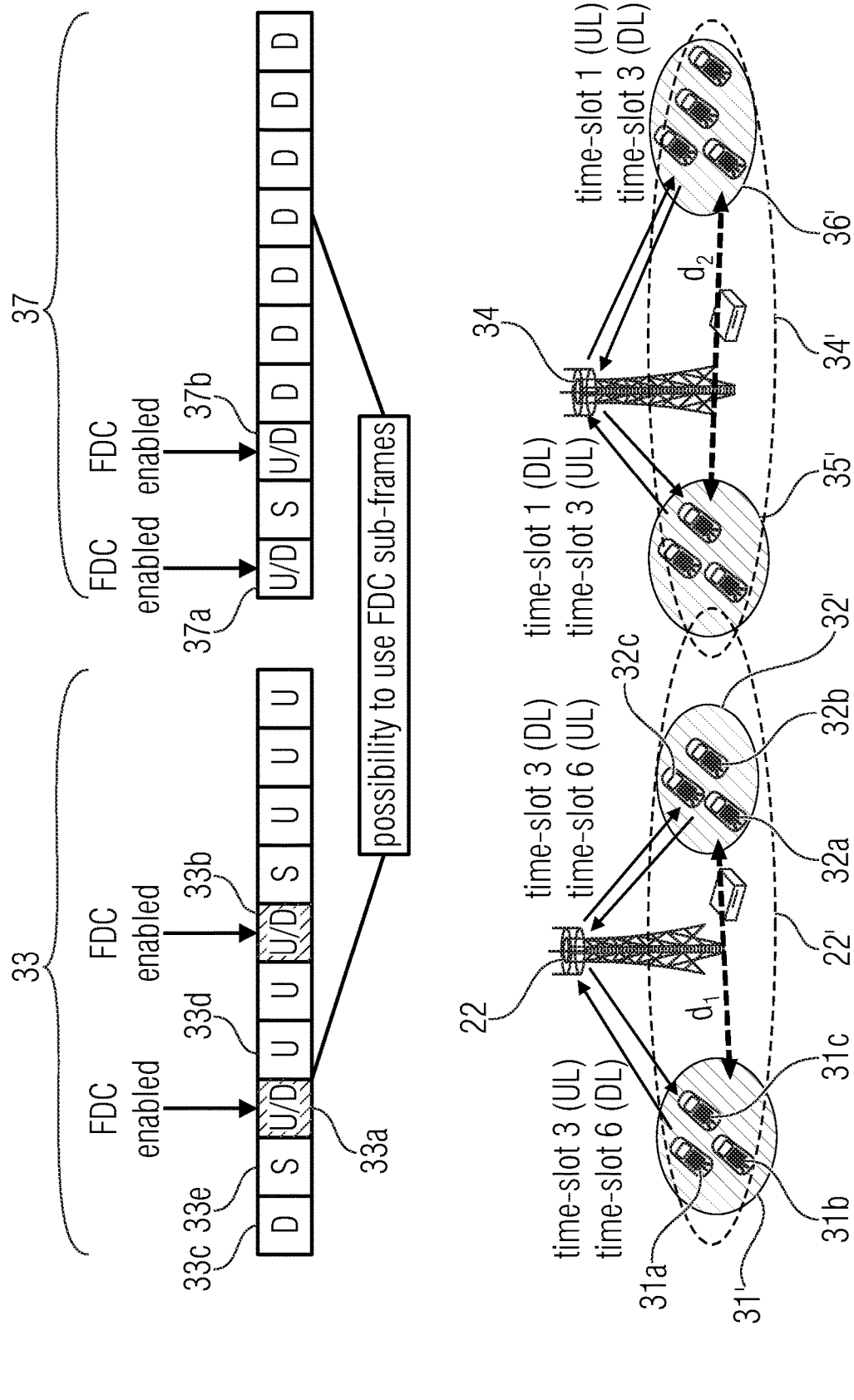

FIG. 3 shows a system 30 comprising a first base station (which may be the BS 22). The BS 22 may be structurally fixed to a terrain. The BS 22 may comprise an antenna or a multi-antenna system for wirelessly communicating with UEs.

The BS may be, for example, an evolved node (eNB), a gNB (using the terminology defined by 5G) or, in general, a g/eNB. It is also possible to use a coordinator/centralized controller or any intelligent function implemented in a hybrid way partly centralized and partly distributed.

The BS 22 may perform communications (or perform communications with an acceptable reliability, QoS, QoS or the like) within a range 22'. In the time instant depicted in the figure, the UEs 31a-31c and 32a-32c happen to be within the range 22'. These UEs are transmitting or receiving data to or from the BS 22. In some examples, at least some of the UEs are IoT devices.

The UEs may be grouped into different clusters (groups). For example, clusters may be created (generated) on the basis of particular properties shared by different UEs. For example, different UEs may share spatial vicinity (e.g., minimum threshold distance between each other), and/or may share a particular UL/DL assignment (e.g., propriety) and/or traffic requirement.

For example, clusters 31' and 32' may be created on the basis of the vicinity between different UEs. For example, the UEs 31a-31c may happen to be in a cluster 31', while the UEs 32a-32c may happen to be in a different cluster 32'. The clusters may be defined according to the mutual position of the UEs. For example, UEs which are at a reciprocal distance less than a threshold may be grouped into a cluster, while UEs whose distance from the other clusters is greater than the threshold may be grouped in different clusters. A cluster may comprise one single UE or a plurality of UEs according to the number of UEs that are in a particular location at a particular time instant (in case the cluster is created on the basis of a different criterion, the number of the UEs in the cluster may be varied).

The transmitted/received data may be organized (e.g., by scheduling) according to a frame (e.g., a periodic frame) defined for the communications (for example, frame 33). The frame composition may follow a standard. The scheduling may change according to the different conditions of the network. The frame may have a time length which may be defined by a standard. For example, 3GPP defines frames with time length of 5 ms and 10 ms, but other time lengths are here possible.

Each frame may be subdivided into different subframes, which may be transmitted/received during time slots associated to the time frames. In each time slot, the signals (e.g., radio frequency, RF, signals) may be at the same frequency band. A time slot may be, for example, the time elapsed during a transmission of a subframe of a periodic frame defined (scheduled) for the communication between a BS and a UE. During a time slot, a communication activity may be performed. In the DL slot 33c, for example, a DL transmission may be performed. In the UL slot 33d, for example, a UL transmission may be performed. The S slot 33e may support special purposes (e.g., defined by a communication standard). The FDC slots 33a (the $3^{rd}$ in the frame 33) and 33b (the $6^{rd}$ in the frame 33) may be used for a UL for some UEs while being used for a DL for other UEs, e.g., using FDC.

In FIG. 3, the UEs of the cluster 31' perform a UL in the slot 33a while, simultaneously, the UEs of the cluster 32' perform a DL. In the figure, the UEs 31a-31c operate as the UE 24 of FIG. 2, while the UEs 32a-32c operate as the UE 26 of FIG. 2. The time slot 33a is a dedicated resource (e.g., defined at step 16) which is simultaneously used for both UL and DL by different UEs. The UEs of the cell 31' are paired with the UEs of the cell 32' (see step 14).

Analogously, the UEs of the cluster 31' perform a DL in the $6^{th}$ slot 33b while, simultaneously, the UEs of the cluster 32' perform a UL. In this case, the UEs 32a-32c operate as the UE 24 of FIG. 2, while the UEs 31a-31c operate as the UE 26 of FIG. 2. The time slot 33b is a dedicated resource (e.g., defined at step 16) which is simultaneously used for both UL and DL by different UEs. The UEs of the cell 31' are paired (associated) with the UEs of the cell 32' (see step 14).

A reason for pairing (associating) the UEs 31a-31c with the UEs 32a-32c may be, for example, the possibility of reducing the interference between the UEs 31a-31c and the UEs 32a-32c. A strategy for deciding which UE (or cluster) shall be paired with which other UE (or cluster) may comprise detecting reciprocal distances between different UEs. For example, the distance $d_1$ between the UEs 31a-31c and the UEs 32a-32c (e.g., the distance between the cluster 31' and the cluster 32'), if greater than a distance threshold, may permit to conclude that the interferences between the UEs will be reduced, e.g., when using FDC. The distance threshold may vary according to the different environment, the geographical situations, the meteorological conditions, the number of UEs, the payload, the QoS, the QoE, and so on. The distance threshold may be determined, in some examples, with tests and/or simulations.

The creation of the clusters and the pairing between the clusters may be interrelated processes: the clusters may be created from UEs by determining those UEs which share similar properties or goals, so as to generate the most appropriate clusters to be paired to each other. For example, it is possible to generate clusters from UEs which are spatially close to each other (e.g., by comparing the mutual distances with threshold values), so as to pair clusters which are distant from each other, so as to reduce interferences between UEs of different clusters.

FIG. 3 also shows a second BS 34 according to some examples. The second BS 34 may have the same or similar structure or function of the BS 22. The second BS 34 may be placed at a location which is different from the location of the BS 22. In particular, the range 34' of the second BS 34 may be sensibly different from the range 22' of the BS 22. There is the possibility that the ranges 22' and 34' partially overlap. While some UEs happen to be grouped in the cluster 35', some other may be grouped in the cluster 36' (more than two clusters may also be defined). The operations of the BSs 22 and 34 may provide spatial continuity: if a UE is moved from range 22' to range 34', it will communicate with the BS 22 and, thereafter, with the second BS 34.

In FIG. 3, the second BS 34 is communicating according to a FDC strategy. In particular, several time slots are defined for UL/DL communications with some UEs. The $1^{st}$ time slot 37a may be chosen from the frame 37 (e.g., at step 16) for supporting DL for some UEs (e.g., the UEs of cluster 35') and, concurrently, UL for some UEs (e.g., the UEs of cluster 36'). The $3^{rd}$ time slot 37b may be chosen (e.g., at step 16) for supporting DL for some UEs (e.g., the UEs of cluster 35'). The pairing (association) may be performed, for example, on the basis of the distance $d_2$ between the different UEs (e.g., by comparing the distance with a distance threshold) or by other criteria to reduce, for example, the interference.

Figure 4:
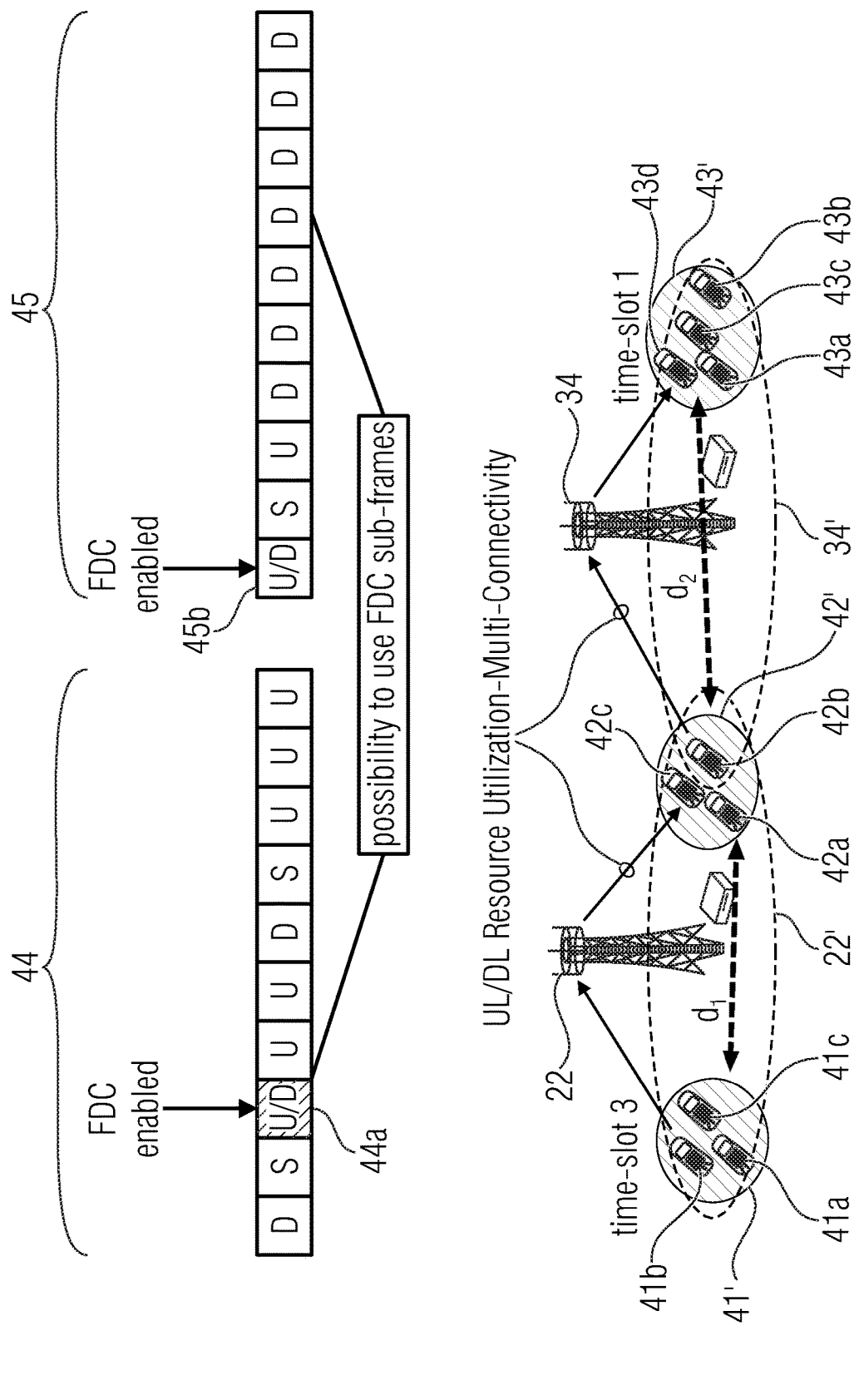

A coordinate action of the BSs 22 and 34 may be performed. FIG. 4 shows an example of a system 30, which may be the same system of FIG. 3 (with the same BSs 22 and 34) after that some time has elapsed and some UEs have been moved (as usual, for example, in mobile communication networks). Some UEs (now indicated as 41a-41c and 43a-43d) may be in the range 22' or 34' or the BS 22 or 34. Clusters 41' and 43' may therefore be defined (e.g., according to the positions of the UEs). While UEs (e.g., those in the cluster 41' and 43') are in the range 22' of the BS 22, some UEs 42a-42c may be at the borders and/or the intersectional region between the ranges 22' and 34'. A cluster 42' associated to both the BSs 22 and 34 may therefore be formed. While the UEs 41a-41c communicate with the BS 22 and the UEs 43a-43d with the BS 34, the UEs 42a-42c may communicate with both the BSs 22 and 34. It is possible to perform a multi-connectivity communication, in which the UEs 42a-42c transmit and receive data to and from both the BSs 22 and 34 (e.g., in one frame). The communications may be scheduled so that the UEs 42a-42c perform transmissions, during a time slot 44a, to the BS 22 and, during a different time slot 45b, perform receptions from the BS 34. FIG. 4 shows a that the communications of the BS 22 are scheduled using a frame 44, while the communications are scheduled using a frame 45 (other frames may be used). In the $3^{rd}$ slot 44a of the frame 44, the BS 22 transmits data (DL) to the UEs 42a-42c. In the $P^r$ slot 45b of the frame 45, the second BS 34 receives data (UL) from the UEs 42a-42c. Notably, the frames 44 and 45 are transmitted/received simultaneously (in this case, the slot 45b precedes the slot 44a).

It may be possible to couple (e.g., at steps 14 and/or 16) the UEs 42a-42c with the UEs 41a-41c so that, at a particular time slot (e.g., 44a), the UEs 42a-42c are in DL with the BS 22, while the UEs 41a-41c are in UL with the BS 22. Further, it may be possible to couple (e.g., at steps 14 and/or 16) the UEs 42a-42c with the UEs 43a-43d so that, at a particular time slot (e.g., 45b), the UEs 42a-42c are in UL with the BS 34, while the UEs 43a-43d are in DL with the BS 34.

The couplings and/or the definitions of the time slots may be performed, e.g., at steps 14 and/or 16, for example, by keeping in account criteria such as threshold distances between the UEs, the positions of the UEs with respect to the BSs and the ranges, and the payload conditions. If, for example, the first BS 22 cannot support additional payload in UL (or DL), the second BS 34 may relieve the first BS 22 by assuming some UL (or DL) payload.

The BSs 22 and 34 may communicate with each other and/or with a communication network (e.g., a geographic network) in real time. The BSs 22 and 34 may concur to define the most advantageous scheduling for the communications (e.g., on the basis of network conditions, such as the payload at the BSs, and/or data obtained by measurements performed on the communication, e.g., by the UEs, and so on). It may be possible to define a strategy for migrating in real time from a normal operation mode (FIG. 3) to a multi-connectivity operation mode (FIG. 4) and/or vice versa. A master BS and/or a coordinator may be defined for this purpose.

Figure 5:
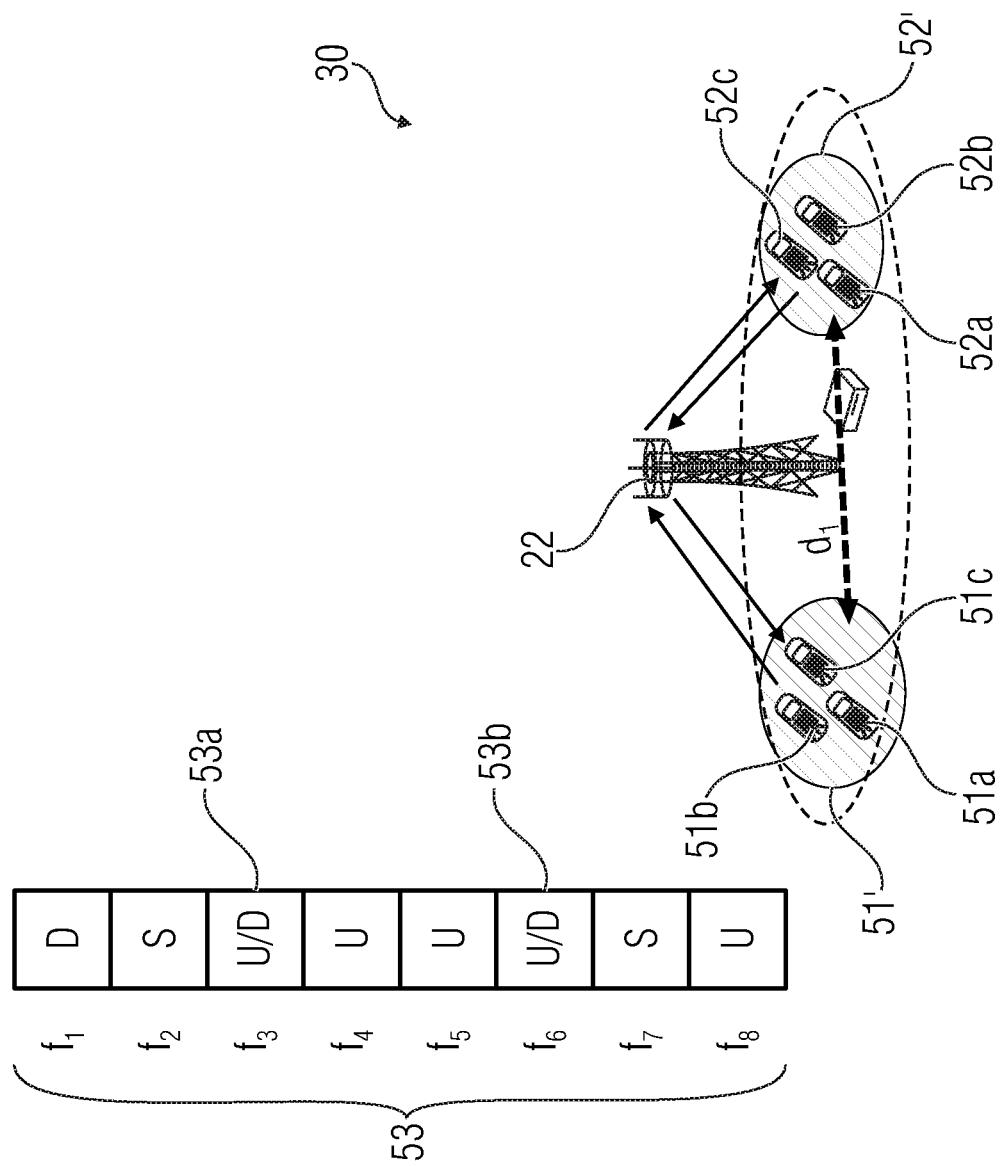

FIG. 5 shows a system 30 (which may be the same of FIGS. 3 and 4) which may be operating in FDD. Only the BS 22 is shown for simplicity. Here, a coupling (pairing, association) between UEs 51a-51c (cluster 51') and UEs 52a-52c (cluster 52') is performed, e.g., at step 14, e.g., on the basis of criteria such as the distance between the UEs, the mutual interference, the QoS, the QoE, and so on. Here, a frequency spectrum 53 may be divided into a plurality of bands, $f_1$-$f_8$. While some bands may be for UL, some other may be for DL, and some other for special purposes.

The bands $f_3$ and $f_6$, indicated with 53a and 53b, may be dedicated resources (e.g., resource blocks, RBs) which are used for UL by UEs 51a-51c, and for DL by UEs 52a-52c, or vice versa. There may be no or little interference between the UL communications from some UEs and the contextual DL communications to the paired UEs.

Simultaneously, the operations at the BS 34 (not shown in FIG. 5) may be performed analogously. It is also possible to shift to a multi-connectivity operation in which both the BSs 22 and 34 cooperate to permit the communications with UEs which are at the borders (or the intersectional locations) between the ranges 22' and 34'.

Figure 6:
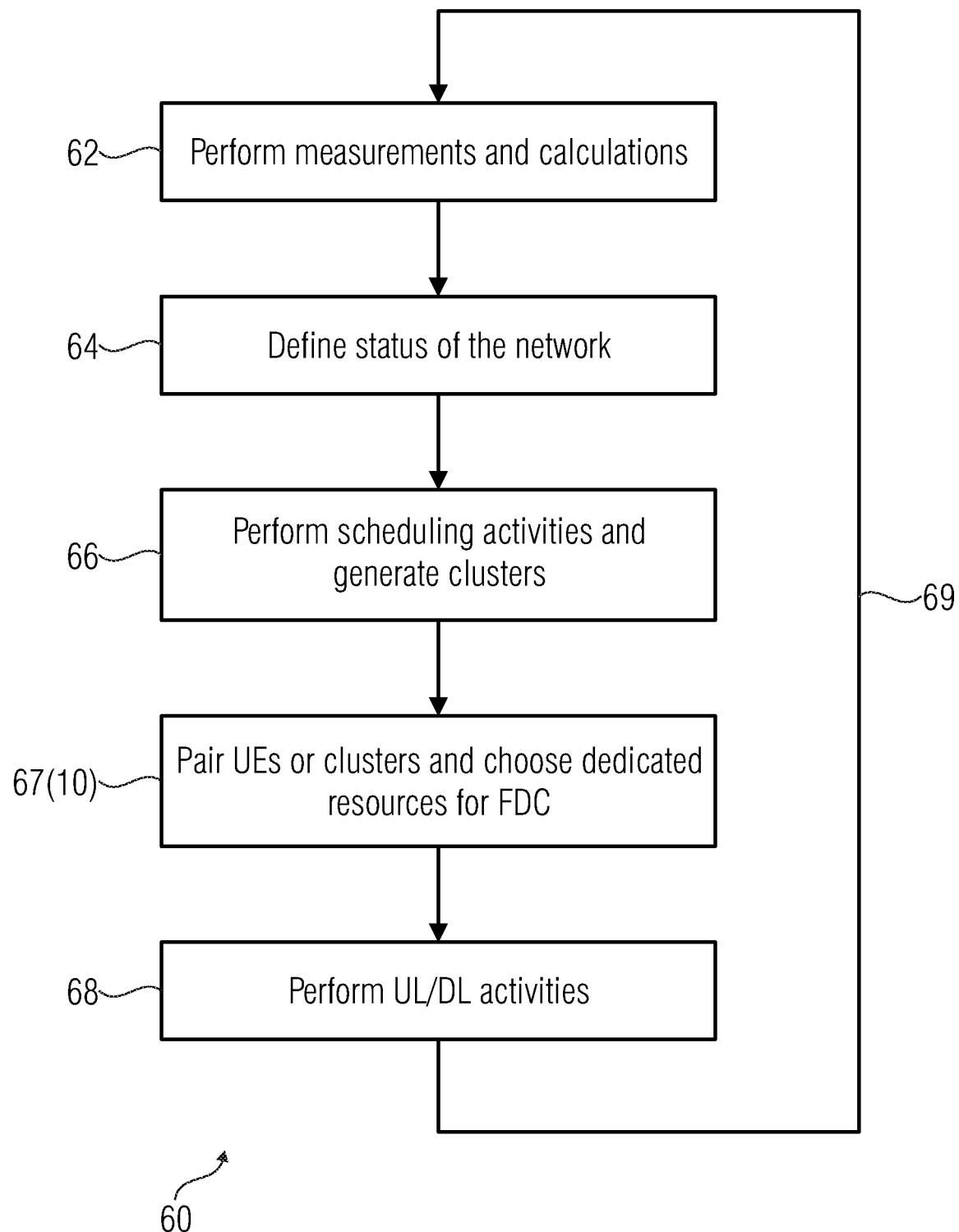
FIG. 6 shows a method according to an aspect of the invention.

FIG. 6 shows a method 60 which permits the communications between UEs (e.g., UEs 24, 26, 31a-31c, 32a-32c, 41a-41c, 42a-42d, 51a-51c, 52a-52c) using a BS (e.g., BSs 22 and/or 34).

At step 62, measurements and calculations may be performed. Measurements may be performed, for example, by UEs and/or the BS (or BSs). In particular, a UE may derive an interference value and/or a QoS and/or a QoE value, e.g., by counting the quantity of received/transmitted good frames (e.g., by using a cyclic redundancy check, CRC), by measuring the signal to interference plus noise ratio, SINR, the interference to noise ratio, by measuring the background noise and/or background interference, and so on.

The BS may also perform, in addition or in alternative, measurements to determine the overall interference of the network. In addition or alternative, a method for measuring interference may comprise, for example, measuring (e.g., counting) acknowledgment/non-acknowledgment message (ACK/NACK) rates.

The BS may, for example, perform measurements to detect the position of the UEs. The measurements may comprise time of arrival (TOA), time difference of arrival (TDOA), angle of arrival (AOA), phase difference of arrival (PDOA) measurements, and measurements on signal level. On the basis of these measurements the BS may determine, for example, the positions of the UEs. On the basis of these measurements (e.g., using the measured positions) the BS may determine the distances between the different UEs. A UE may also perform at least one of TOA, TDOA, AOA, PDOA, and signal level measurements. A UE may also derive its position on the basis of other techniques, such as a technique based on global positioning system (GPS), for example. Measurements may comprise aggregate measurements (e.g., integer values) which are based on values evolving along time. Filtered measurements may be used.

At step 62, UEs and BS may transmit data associated to the measurements (e.g., QoS, QoE, interference, reciprocal distances, and so on) to each other.

At step 64, a status of the network may be defined. The status of the network may be, inter alia, associated to the throughput, the payload, the QoS, QoE, the positions of and/or distances between the UEs, the numbers of UEs within the range of the BS, and so on.

Step 64 may comprise a definition of expected services to be provided (e.g., in real time). For example, priority values associated to particular communications and/or UEs may be evaluated (e.g., for ultra-reliable and low latency communications, URLLC, and/or other service). Expected conditions of the network (e.g., in terms of expected throughput, payload, interference, traffic) may be estimated, e.g., on the basis of the expected services and/or the performed measurements.

Step 64 may comprise a cooperation between different BSs (e.g., BSs 22 and 34) to determine the presence of a UE or of a group (e.g., a cluster) of UEs in at the borders of or at the intersectional region between the ranges of the BSs. An exchange of information (e.g., the payload of the two different BSs) may be performed. For example, a first BS may indicate that a threshold limit for UL (or DL) has been (or is to be) reached.

Step 66 may comprise an operation of generating clusters (clustering) from different UEs. When clustering is performed, groups of UEs are formed. A cluster may be generated by grouping UEs which share a particular property (e.g., they may be in the vicinity to each other). For example, multiple UEs in the same cluster may have a reciprocal distance which is less than a distance threshold. Additionally or alternatively, the maximum distance between the most distant UEs in the same cluster is less than a distance threshold. Additionally or alternatively, all the UEs in the same cluster may be retrieved as UEs within the same radium from a geographical point. The UEs in the same cluster may transmit and receive frames at the same frequency bands and/or in the same time slots, for example. As shown in FIGS. 2-4, the UEs in the same cluster may perform a UL all together simultaneously at the same frequency band. In other examples, other dedicated resources may be used.

In some examples, the generation of clusters is performed by defining groups of UEs which have some properties, requirement, or assignment in common. For example, the UEs in the same cluster/group may have a mutual distance which is less than a defined threshold. In addition or alternative, the UEs in the same cluster/group may have share the UL/DL resource assignment or traffic requirement. In addition or alternative, the UEs in the same cluster/group may have compatibility (e.g., low interference with respect to each other).

The UEs in the same cluster/group may communicate at the same frequency, for example. The UEs in the same cluster/group may have the same scheduling, for example. The UEs in the same cluster/group may communicate at different spatial channels, for example.

The definition of the clusters may be based on measurements, estimations, and calculations performed at step 62 and/or the status of the network determined at step 64. The definition of the clusters may be performed by the BS, by a master BS, or by a coordinator, for example.

Step 66 may comprise an operation scheduling the communications. It is possible, for example, to define UL/DL allocations (e.g., according to the definitions of 3GPP, 4G, 5G, or the like). For example, it is possible to define a periodicity (e.g., 5 ms, 10 ms, or other). The frames to be used may be defined according to patterns, which may be established by a standard. The definition of the scheduling may be performed by the BS, by a master BS, or by a coordinator, for example.

Step 67 (e.g., implementing method 10) may be performed (e.g., downstream to step 66 or in parallel thereto) for the purpose of defining dedicated resources (e.g., one or more time slots) for supporting FDC between two UEs (or clusters) and/or for pairing (associating) the UEs and/or clusters.

At step 67 it may be possible to choose which UE(s) or cluster(s) is paired (associated) with which other UE(s) or cluster(s). For example, it may be possible to define which time slot (subframe) may be most suitable for the FDC. This definition may be performed on the basis of at least one of the performed and calculated data obtained at step 62, the status defined at step 64, and the activities performed at step 66. The pairs between UEs and/or clusters and/or the dedicated resources (subframe, time slots, spatial channels, power levels, codes, or combinations thereof) on which full duplex communications are to be performed may be signalled from the BSs to the UEs, for example.

Additionally or alternatively, at step 67 it may be defined if two different BSs cooperate with each other in multi-connectivity. Accordingly, it is possible to execute a definition of the dedicated resource (subframe, time slots, spatial channels, power levels, codes, or combinations thereof) at which to perform the FDC.

In some examples, steps 66 and 67 may be interrelated to each other: the generation of the clusters may be performed so as to obtain the best pairs of clusters for the purpose of performing a particular goal. For example, if the goal is to reduce the interference between different clusters, the clusters may be defined according to a criterion which minimizes the interference between clusters (e.g., by generating each cluster from UEs which are in the vicinity with each other). Clusters may also be defined on the basis of assignments: for example, UEs which shall transmit great amounts of data in UL may be grouped in a first cluster, while UEs which shall receive great amounts of data in DL may be grouped in a second cluster, so as to use a dedicated resource in UL for the first cluster while, simultaneously, the second cluster uses the same dedicated resource in DL.

At step 68 (which may be downstream to step 67), UL and DL communications between UEs and BSs may be performed according to the scheduling, the clusters, and the pairings defined in the previous steps.

Line 69 refers to the fact that at least some of the activities of the method 60 may be repeated (e.g., reiterated) and re-executed in real time (e.g., in cycles).

Accordingly, the communications may result to be better adapted to the conditions (QoS, mutual distances, interferences, etc.) of the network.

Figure 7:
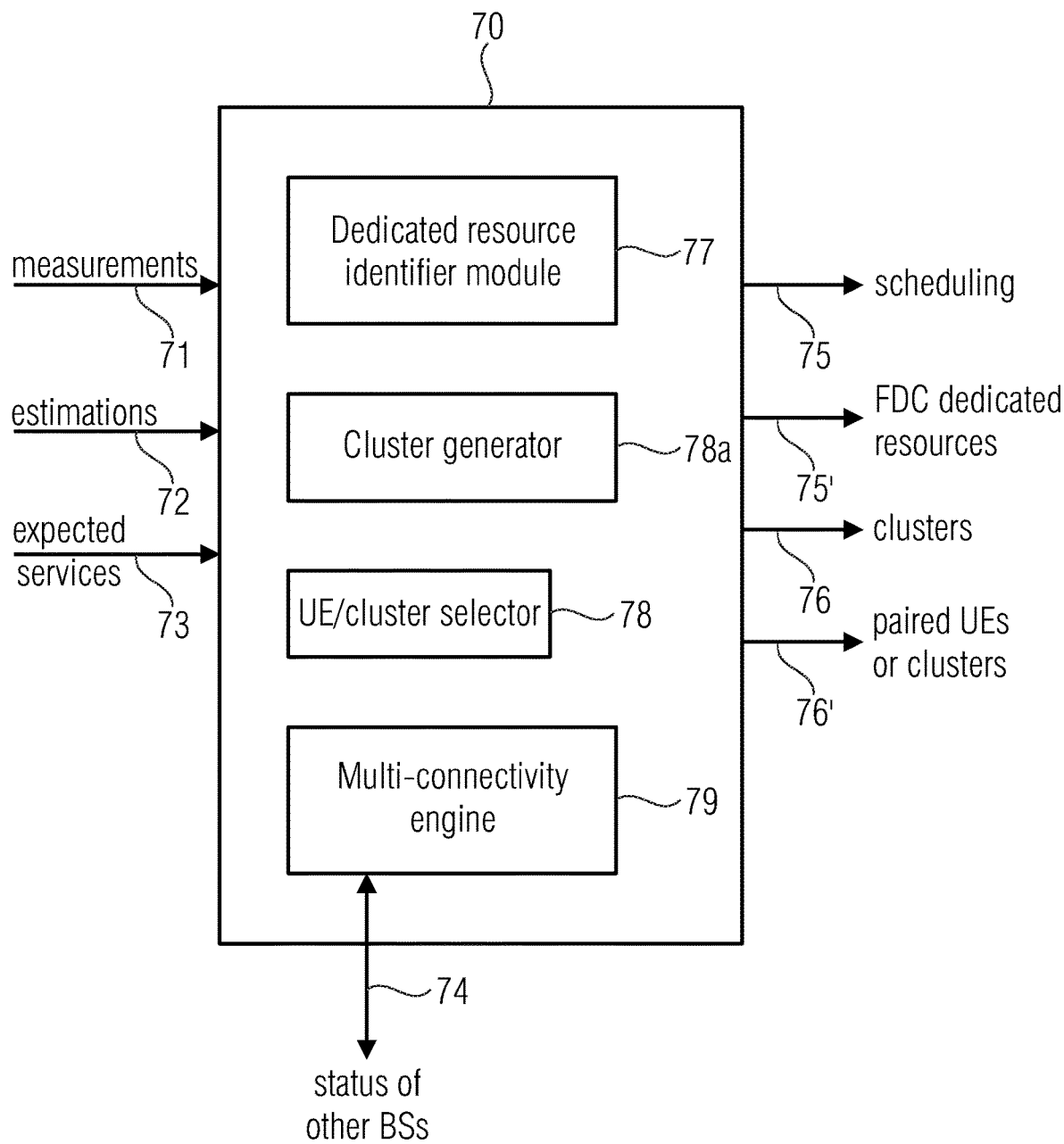
FIG. 7 shows a system according to an aspect of the invention.

FIG. 7 shows a system 70 which may permit to perform operations discussed above. In examples, the system 70 is embodied by a BS (e.g., BS 22 or 34). The system 70 may be input by measurements 71 (e.g., distances, interferences, SINR values, interference to noise ratio, INR, values, QoS values, QoE values, measuring, e.g., counting, acknowledgment/non-acknowledgment message rates, measuring the background noise and/or background interference, and so on), and/or estimations 72 (e.g., expected estimated values, such as an expected payload for the future), and/or expected services 73 (e.g., urgent calls, first responder communications, and so on). The system 70 may define a scheduling 75 and/or decide the FDC dedicated resources 75' to be used (e.g., time slots for FDC, frequency bands for FDC, etc.).

The system 70 may communicate with other BSs to transmit its status and to obtain the status 74 of the other BSs (the status comprising, for example, the number of UEs at the reciprocal border or intersectional region between the two BSs, the expected traffic, the estimated conditions, the payload, and so on).

In some examples, the system 70 may comprise a dedicated resource identifier module 77, which may identify (e.g., define, determine) the advantageous dedicated resources (e.g., time slot or a frequency band in a scheduled frame, and/or a spatial channel, and/or a power level, and/or a code dimension), according to parameters based on criteria which may be meant at reducing the global interference and/or ameliorating the communications. The dedicated resources identifier module 77 may perform step 16 of FIG. 1, for example.

The system 70 may comprise a cluster generator 78a. The cluster generator 78a may create clusters (groups) 76, e.g., by choosing UEs to be part of the same cluster. For example, a cluster may be formed by UEs which share a particular property, assignment or requirement. For example, UEs which are spatially closed to each other may be grouped in the same group/cluster. Additionally or alternatively, UEs which share the same UL/DL resource assignment or traffic requirement may be grouped in the same group/cluster (in some examples, however, provided that their mutual distance is under a threshold). For example, UEs which shall perform high priority communications may be grouped in the same group/cluster.

The system 70 may comprise a UE/cluster selector 78 which may select the most appropriate pair of different UEs or clusters. The UE/cluster selector 78 (which may perform step 14) may couple the UEs/clusters on the basis of the status of the network (which may comprise, for example, the distance between the clusters and/or the reciprocal interference). The UE/cluster selector 78 may provide an output 76' indicating the clusters as paired to each other.

The multi-connectivity engine 79 may exchange information with other BSs, in particular for cooperating in agreement with the other BSs for performing multi-connectivity operations, in case the multi-connectivity scenario is used (e.g., as shown in FIG. 4).

Figure 8:
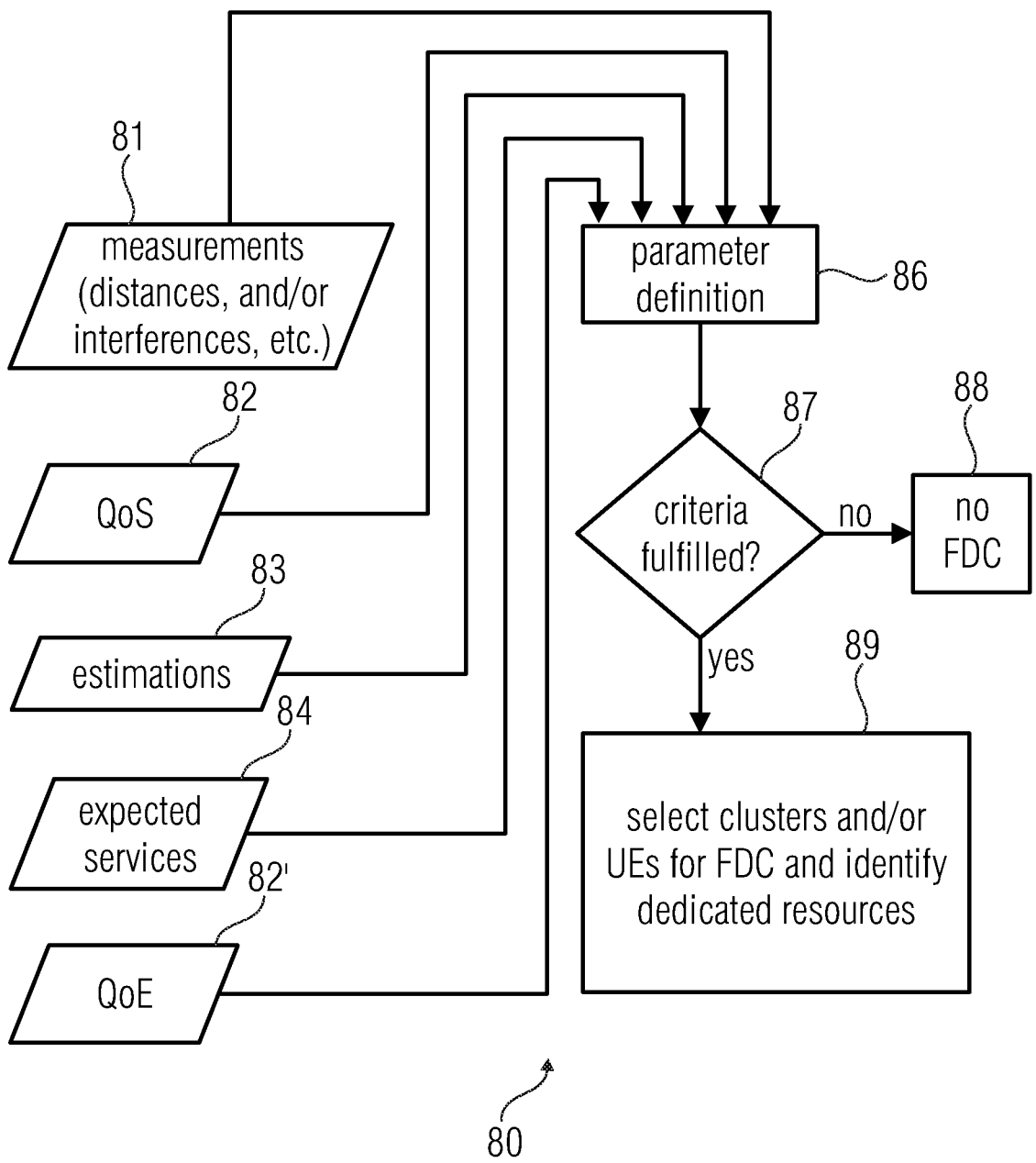
FIGS. 8-10 show examples of communication methods according to aspects of the invention.

FIG. 8 shows a method 80. The method 80 may be performed, for example, to decide whether to perform FDC and/or to select the UE or cluster to pair to each other and/or to generate clusters and/or to identify which dedicated resources (such as time slot for a subframe and/or frequency band to be shared by coupled clusters or UEs and/or spatial channel and/or power level and/or code) is to be used for the FDC.

The method 80 may comprise a step 86 of defining a parameter (parameter definition). The parameter may be based on one or on a plurality of component(s).

The parameter may be based on at least components such as measurements 81 which may relate to the distances between UEs and/or clusters, interferences measured by the UEs and/or the BS, power consumption, and so on. A central node (e.g., master BS, coordinator, and so on) may collect measurements-associated data from UEs and/or clusters. The parameter may be obtained on the basis of calculations and/or estimations performed on the measurements 81. For example, the mutual distances between UEs and/or clusters may be calculated on the basis of their positions, e.g., retrieved by the BS. Aggregate data (e.g., integer values, e.g., in the time domain and/or in the frequency domain, transformations such as Fourier and/or Laplace transformations, and so on) may also be calculated and may use to define the parameter. Values such as the channel covariance matrix for the channel may be calculated. Measurements may comprise measurements on the background noise and/or background interference.

Additionally or alternatively, the parameter defined at step 86 may be based on components such as the QoS 82, which may be determined, for example, by UEs and/or by the BS. For example, results from CRC calculations may be performed. A central node (e.g., master BS, coordinator, and so on) may collect QoS-associated data from UEs and/or clusters.

Additionally or alternatively, the parameter defined at step 86 may be based on components such as estimations 83. Estimations may comprise determinations of the behaviour of the network after operating in FDC. A central node (e.g., master BS, coordinator, and so on) may collect estimation-associated data from UEs and/or clusters.

Additionally or alternatively, the parameter defined at step 86 may be based on components such as expected services 84. For example, the parameter defined at step 86 may vary according to the number of urgent calls that are requested. The more urgent calls, the more probable the selection of FDC.

Additionally or alternatively, the parameter defined at step 86 may be based on components such as QoE 82' measurements.

Once the parameter is defined at 86 on the basis of one or more component(s) 81-84, it is possible to verify if the criteria for selecting (enabling) FDC is fulfilled. If NO, no FDC is performed at step 88. If YES, the selection of the UEs and/or clusters to be paired with each other may be performed, e.g., at step 14 and/or the dedicated resources (time slot and/or frequency band and/or power level and/or spatial channel and/or code) to be used for the FDC is identified, e.g., at step 16.

Importantly, the parameter defined at step 86 may be taken into account for the selection of the UEs and/or clusters and/or for the identification of the dedicated resources.

For example, if two UEs or clusters (e.g., UEs 31a-31c and 32a-32c in FIG. 3) are at a distance which is over a distance threshold it may be possible to pair these two UEs or clusters with each other. In this case, the criteria may be verified at step 87 by comparing the distance between the two UEs or clusters on the basis of the measurements 81 (the measurements comprising distances and/or positions of the UEs and/or clusters). For example, the BS may compute distances on the basis of information received from the UE(s). The BS may monitor interference from interference measurements, acknowledgment/non-acknowledgment message rates between BS and UEs, etc.

For example, if the interference is extremely low between two UEs or clusters, it may be possible to pair these two UEs or clusters with each other. In this case, the criteria may be verified at step 87 by comparing the distance between the two UEs or clusters on the basis of the measurements 81 (the measurements comprising interference-related values, such as SINR values, INR values, measurements of background noise and/or background interference, and so on).

The criteria verified at step 87 may be based on a composition of different components. For example, it is possible to pair two different UEs or clusters on the basis of both their reciprocal distance and their interference. In this case, the parameter defined at step 86 may comprise a component based on distance-related measurements and a component based on interference-related measurements.

Additionally or alternatively, the criteria verified at step 87 may comprise QoS-related data, which may be associated, for example, to other data (such as the measurements 81). The same may be valid for estimations.

At step 89, it is possible to identify dedicated resources (time slots, frequency bands, spatial channels, power levels, and/or code dimensions) and/or select the first and second UEs or groups from a plurality of UEs on the basis of a parameter (e.g., defined at 86) having a component (e.g., one of components 81-84) associated to the measured and/or estimated and/or predicted interference between the UEs or groups and/or the quality-of-service, QoS, and/or the quality-of-experience, QoE, so as to pair the UEs or groups to reduce interferences and/or increase the QoS.

Additionally or alternatively, at step 89, it is possible to select the first and second UEs or groups from a plurality of UEs or groups on the basis of a parameter (e.g., defined at 86) having a component (e.g., based on measurements 81) associated to a reciprocal distance between the UEs or groups. It is possible, for example, to pair the first and the second UEs if the distance between the first and the second UEs or groups is greater than a threshold.

Additionally or alternatively, at step 89, it is possible to identify dedicated resources and/or select the first and second UEs or groups from a plurality of UEs or groups on the basis of assigned priority values, so as to selectively increase the uplink and/or downlink dedicated resources for higher priority communications.

Additionally or alternatively, at step 89, it is possible to determine the first and second groups/clusters from a plurality of UEs on the basis of UL/DL resource assignment or traffic requirements.

Additionally or alternatively, at step 89, clusters may be generated.

Figure 9A:
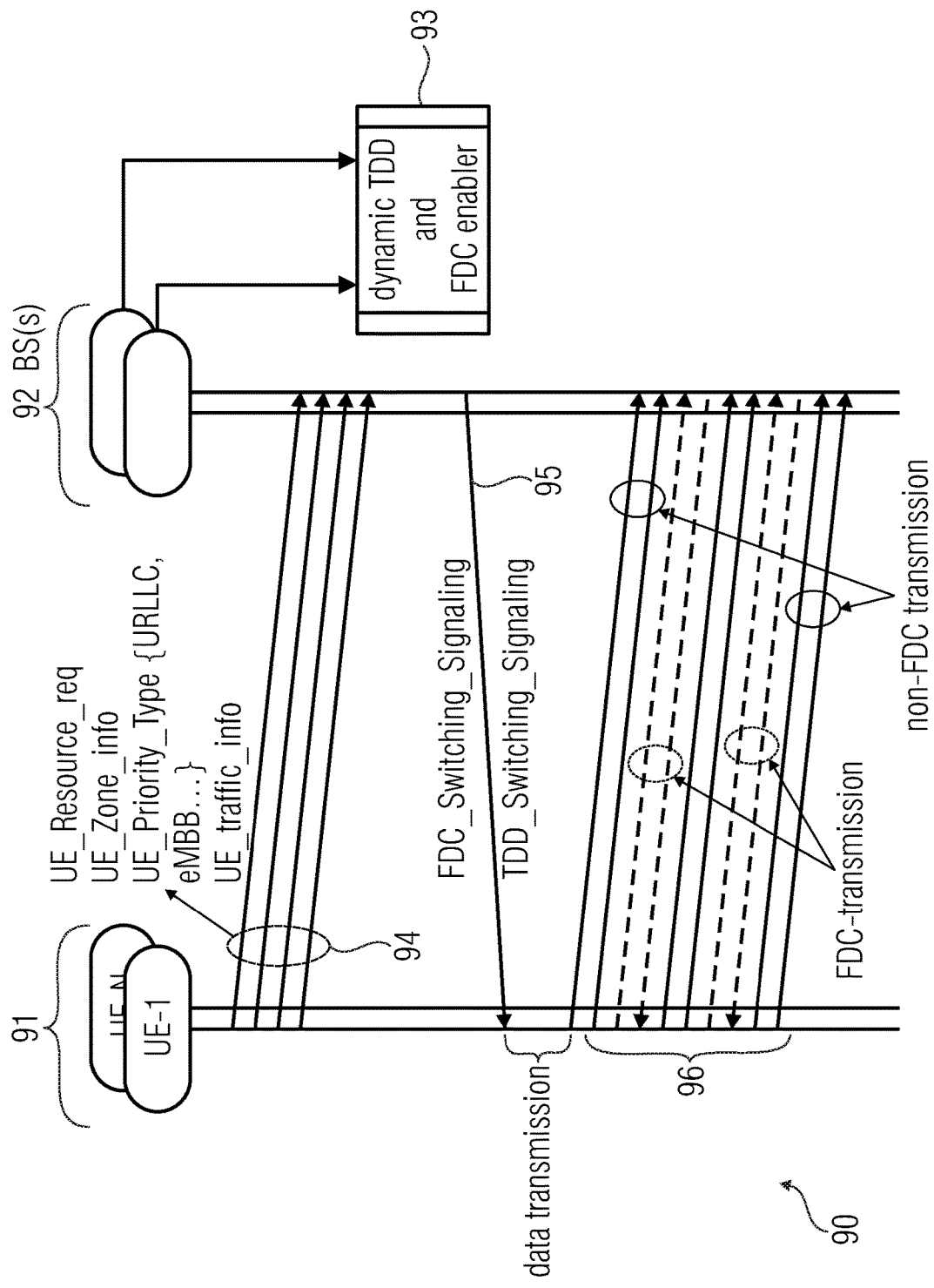

FIG. 9A shows a scheme 90 with operations of signaling between a master node, or coordinator (e.g., a BS) and other nodes (e.g., the UEs) for signalling the change in operations.

As shown in scheme 90, a plurality of UEs and one or mode BS(s) may communicate to each other. At 94, the UEs may transmit data such as resource requested (UE_Resource_req) and/or priority of the communications (UE_Priority_Type {URLLC, eMBB . . . }), e.g., to at least partially embody the indication of expected services 84. At 94, the UEs may transmit data such as UE_Zone_info, e.g., to at least partially embody measurements 81 regarding the position of the UEs 91 or their clusters. At 94, the UEs may transmit data regarding the traffic, such as UE_Traffic_info, e.g., to at least partially embody the transmission of the QoS 82.

On the basis of the data obtained by the UEs, the master node (e.g., BS 92) may determine, e.g., in real time, whether to operate in FDC, e.g., using a dynamic TDD and FDC enabler 93. The dynamic TDD and FDC enabler 93 may perform, for example, at least one of the steps 14, 16, and 87. The dynamic TDD and FDC enabler 93 may determine whether to operate in TDD or FDD. The dynamic TDD and FDC enabler 93 may determine whether the dedicated resources to be operated simultaneously in DL/UL by two different UEs is a time slot (subframe) at the same frequency band, or a particular frequency band in the same time slot.

The BS(s) 92 may, at 95, signal a "FDC_Switching_Signaling", a "TDD_Switching_Signaling", a "FDD_Switching_Signaling", "non-FDC_Switching_Signaling", for example, to all the UEs which are in the range of the BS(s) and/or to all the UEs of a particular cluster or to all the UEs which are to change their operation to a FDC mode.

At 96, UL/DL transmissions may be performed by UEs 91 with the BS 92 on the basis of the decisions determined by the master node (BS 92). Accordingly, the UL/DL operations may also be performed in multi-connectivity scenario (e.g., as in FIG. 4). While some transmissions are performed using FDC (e.g., in the time slots 33*a*, 33*b*, 37*a*, 37*b*, 44*a*, 45*b*), other transmissions (even in the same frame) are performed without using FDC. Some transmissions may be performed using multi-connectivity and some other transmissions may avoid non-multi-connectivity.

An example of pseudocode for a FDC-enabling function (e.g., operating at the master node) may be:

```
function UE.Switching_decision = FDC_Enabling_Function
(UE.Priority_Type, UE.Positioning_Info, UE.Traffic_Info)
{
UE.cluster_ID = cluser_users (UE.Positioning_Info)
UE.Priority_List = Priority_Analysis (UE.Priority_Type)
UE.Trafic_Priority = Traffic_Analyzer_Prediction (UE.Traffic_Info)
UE. Switching_decision = FDC_Analysis (UE.cluster_ID,
UE.Priority_List, UE.Trafic_Priority)
}# FDC_Analysis( ) is a weighting function decides for the FDC
switching point or returns to legacy TDD/FDD
```

Figure 9B:
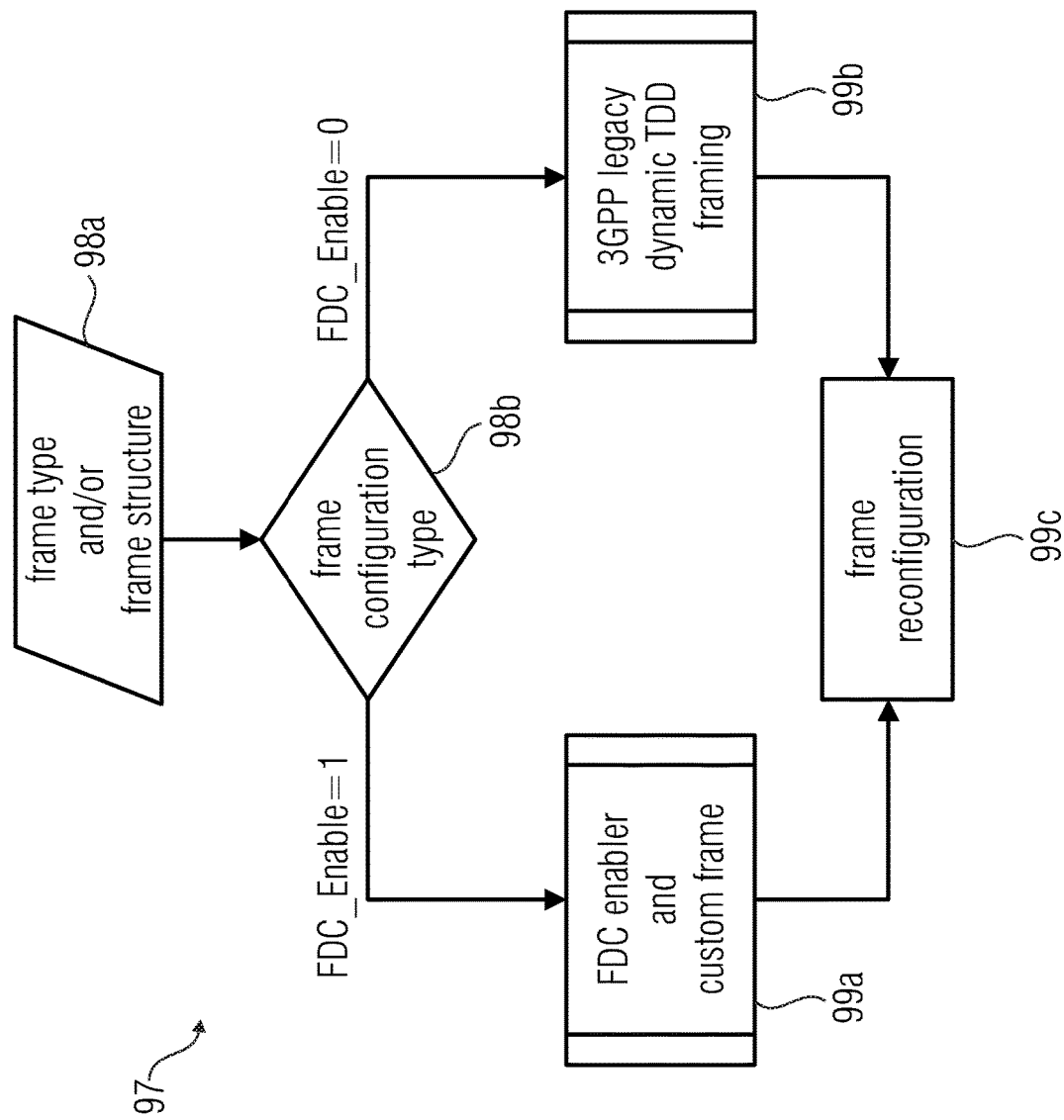

FIG. 9B shows a method 97. The method 97 may reconfigure a frame 98*a* for the FDC. At step 98*b*, it may be determined if the frame configuration type and/or the frame structure (e.g., in terms of length of the time duration is one subframe or one frame) is a FDC frame (e.g., a frame containing dedicated resources which are to be shared by two UEs or clusters) or a non-FDC frame. For example a comparison with an FDC_Enable flag may be performed. If the frame 98*a* shall be reconfigured as a FDC frame, then it is input to the dynamic TDD and FDC enabler 93, for example, at step 99*a*. Otherwise, it is inputted to a non-FDC dynamic framing section 99*b*. The non-FDC dynamic framing section may be configured, for example, to perform a 3GPP legacy dynamic TDD framing, for example. At step 99*c*, the frame is reconfigured.

It is also possible to assign UEs and/or communications with priorities. For example, URLCC communications may have priority over eMMB communications.

The master node (e.g., BS 22, 34, 92) may be flexible in choosing the pairs, the clusters, as well as the dedicated resources to be duplexed.

In some examples, any dedicated resources (e.g., a subframe in a frame or a frequency band or a power level or a spatial channel or a code) may be used for non-FDC communications when a paired (counterpart) UE or cluster is retrieved.

Figure 10:
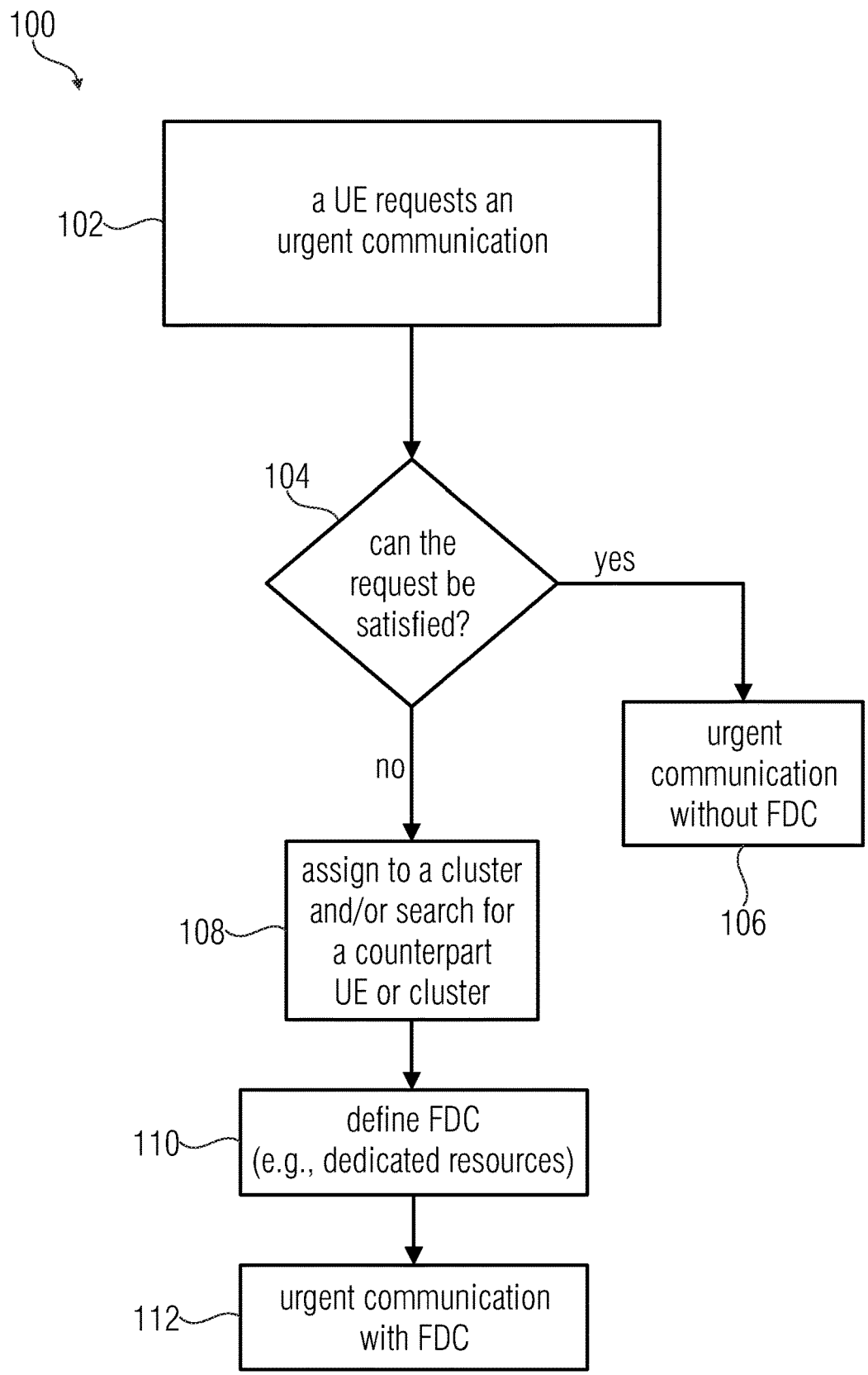

FIG. 10 shows a method 100 in which a UE may request an urgent communication (e.g., URLLC) at step 102. At step 104, it is checked if the request can be satisfied. If possible, the communication is performed at step 106 without necessity of using FDC. Otherwise, at step 108 the network is checked to assign the UE to a cluster (e.g., a high priority cluster) and/or retrieve a valid UE or cluster to be paired to the (cluster of the) UE requesting the urgent communication. This search may be performed, for example, by performing at least one of the steps 62, 64, 86, and 87, and may comprise, for example, the evaluation of measurements 81, QoS 82, QoE 82', estimations 83, expected services, 84, and the verification of the criteria on the basis of parameters having, as at least one component, one of the entries 81-84. Once the most valid counterpart UE is found in the network (e.g., the most distant UE from the urgent-call-requesting UE, and/or the UE which has less mutual interference with the urgent-call-requesting UE, and so on), at step 110 the most valid UE may be elected as the most valid UE to be coupled with the urgent-call-requesting UE. Parameters such as the dedicated resources to be used (e.g., the time slot and/or the frequency band and/or the power level and/or the spatial channel and/or some particular codes) may be chosen. After signalling (e.g., at 95), the two UEs will transmit concurrently in correspondence of the same dedicated resources with the same BS: however, while one UE will operate in DL (receive), the counterpart UE will operate in UL (transmit). The interference will therefore be minimized. Basically, dedicated resources may be increased for higher priority communications.

Figure 11:
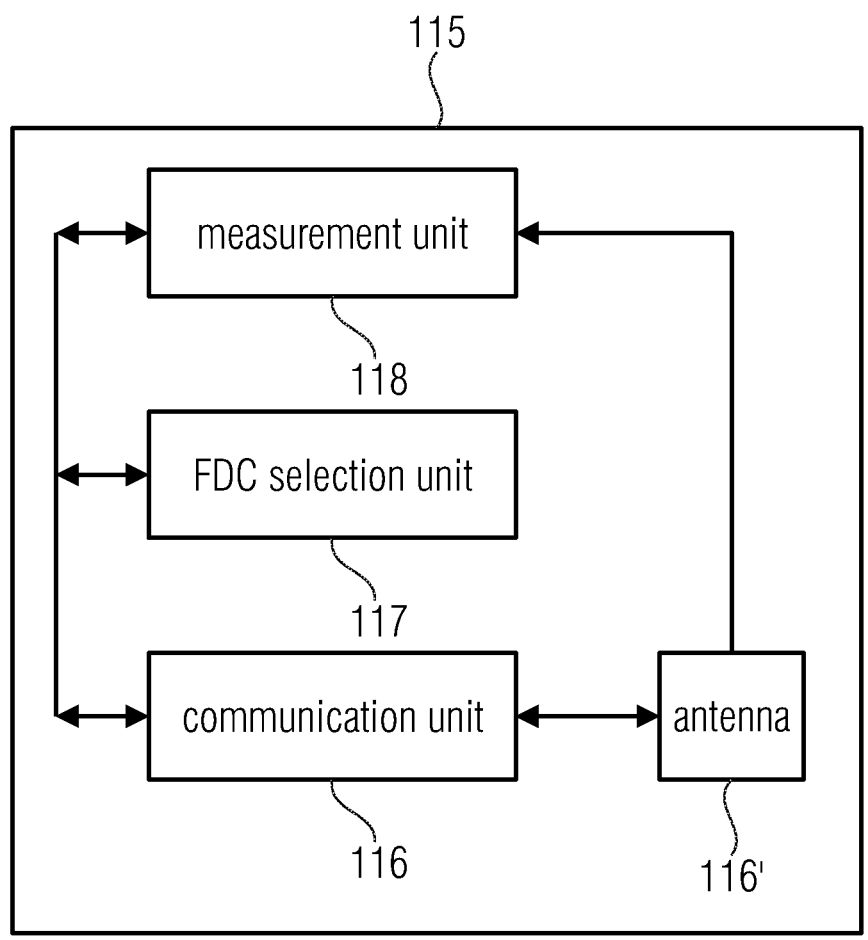
FIG. 11 shows a communication device according to an aspect of the invention.

FIG. 11 shows an apparatus 115 which may be a BS or a UE. The apparatus 115 may comprise a communication unit 116 for UL/DL communications (e.g., with a BS). The communication unit 116 may be connected to an antenna 116' which may physically transmit and receive signals to and from the BS.

The apparatus 115 may comprise an FDC selection unit 117. The FDC selection unit 117 may be configured to determine whether to perform an FDC or not, e.g., on the basis of signalling. In case of necessity of initiating an FDC, the communication unit 116 receives from the FDC selection unit 117 a command of operating according in FDC. The FDC selection unit 117 may indicate, for example, the dedicated resources (time slots and/or frequency bands and/or spatial channel and/or power level and/or code) to be shared with a counterpart UE (as selected by the BS).

The apparatus 115 may comprise a measurement unit 118 which may determine measurements (e.g., 81) associated to the performance, the interference, the position, the distance with other UEs or groups and/or a BS. The measurement unit 118 may provide the dedicated resources with information to be used by the BS to verify if the criteria for requesting FDC are fulfilled or not.

Figure 12:
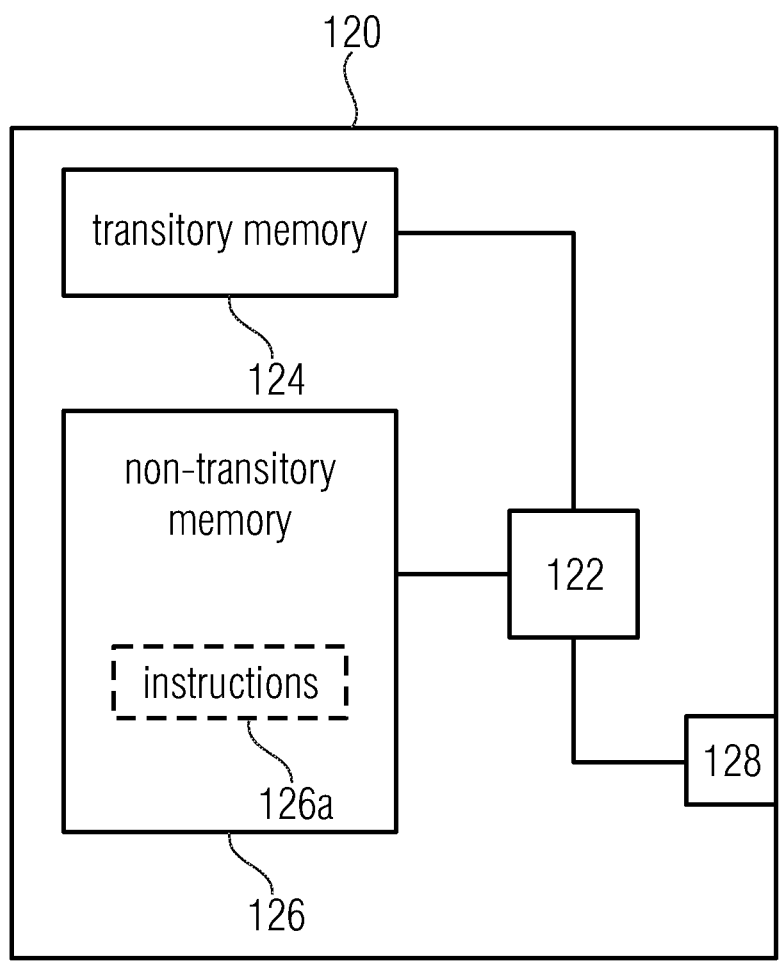
FIG. 12 shows a processor system according to an aspect of the invention.
Figure 13:
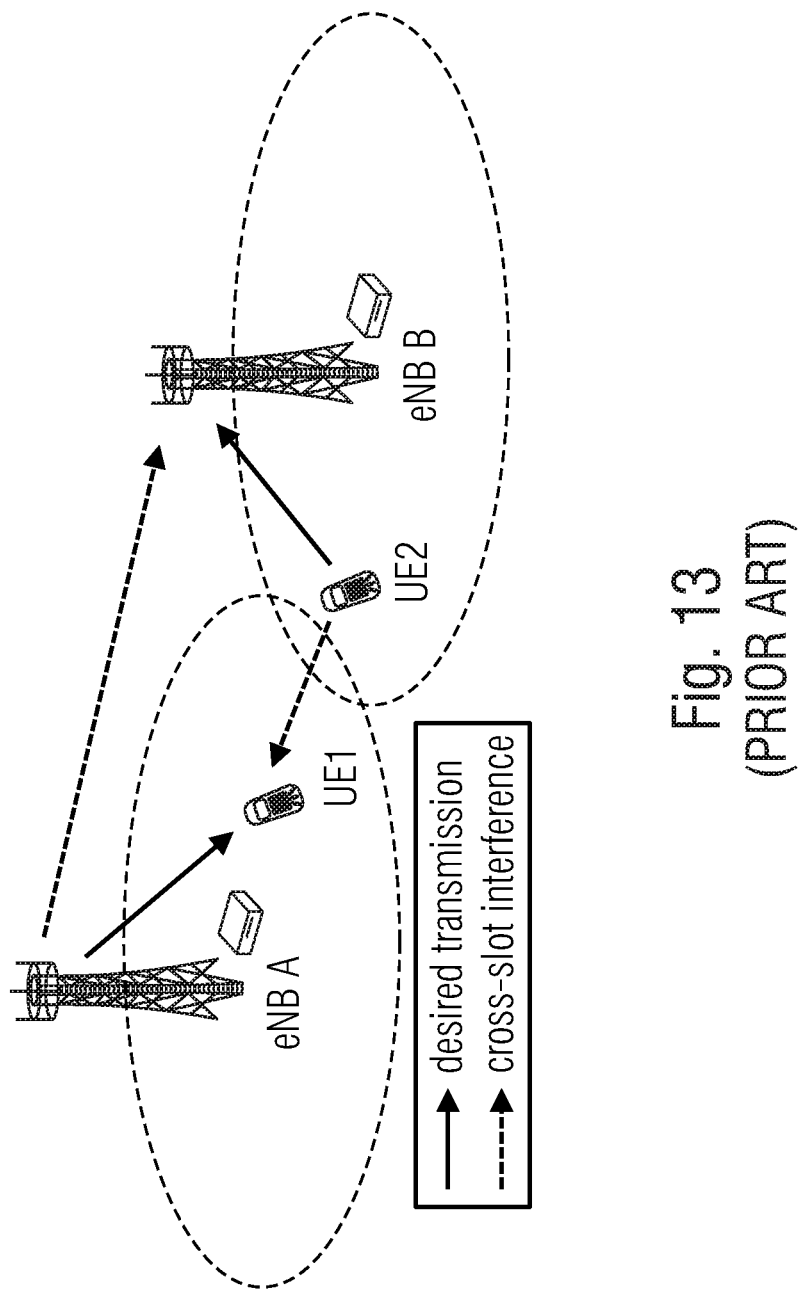
FIG. 13 shows cross-slot interference and signal transmission on a cellular network according to known technology.
Figure 14:
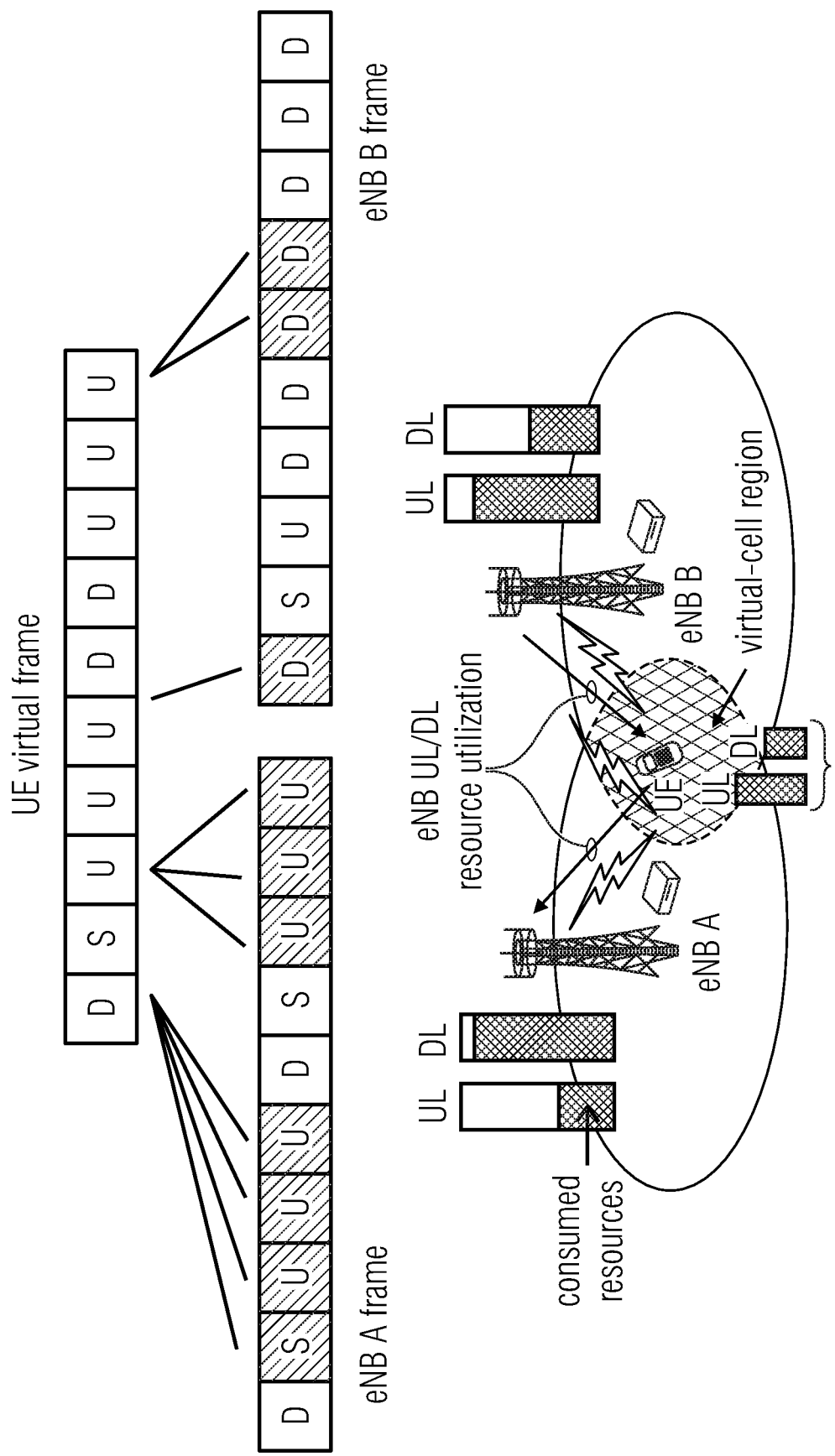
FIG. 14 shows a virtual-cell/virtual-frame concept and uplink/downlink multi-connectivity.

FIG. 12 shows a system 120 comprising a processor 122 which may implement at least one of the methods, steps, and/or operations discussed above. The system 120 may comprise transitory memory 124 (random access memory, RAM and/or registers). For example, the structure of the data frames and the dedicated resource-allocations shall be written in real time in the transitory memory 124.

Further, the system 120 may comprise a non-transitory memory unit 126 (e.g., implemented in a read-only memory, ROM, a flash, a firmware, and so on) comprising instructions 126*a* which, when executed by a processor (e.g., processor 122), may cause the processor to perform at least one of the methods and/or operations described above.

The system 120 may also comprise at least input/output, I/O, unit 128, for communicating to other devices.

In some examples, the system 120 may embody a BS (e.g., 22, 34) and/or the dynamic TDD and FDC enabler 93, and/or perform the operations at steps 14, 16, 62, 64, 68, 86-89, 94-96, 98*a*-99*c*, and 102-112. The I/O unit 128 may comprise, for example, an interface to the UL/DL communications with UEs, with other BSs, and/or an interface to a user.

DISCUSSION

Here there is proposed a method to reduce congestion in TDD frame formatting if different cells have different UL/DL frame configurations. Instead of enabling UL/DL multi-connectivity as in the virtual cell concept (described above), according to examples a BS (e.g., g/eNB) may be free to:

Select the right users to coexist on the same resource (at the same subframe) in different duplexing direction, i.e., one is UL and the other is down-link, using full duplex communication (FDC);

The g/eNB s (or the g/eNB coordinator/centralized controller or any intelligent function implemented in a hybrid way partly centralized and partly distributed) has to select UEs which are sufficiently separated to reduce inter-user interference when FDC is used (UEs in UL interfering UE on DL on the same FDC subframe);

g/eNB s (or the g/eNB coordinator/centralized controller or any intelligent function implemented in a hybrid way partly centralized and partly distributed) are free to select any configuration, then, without making effort to control UL/DL based on g/eNB s congestions;

g/eNBs can cluster user and signal them to transmit in FDC mode; hence, URLLC users can urgently be served and coexist with mobile broadband users.

Examples are proposed that may be implemented in both distributed and centralized way or in an hybrid way (partially centralized and partially distributed), depending on the deployment scenario and the application/service type. They introduce mechanisms to enable FDC in cellular network where the g/eNB s (or the g/eNB coordinator/centralized controller or any intelligent function implemented in a hybrid way partly centralized and partly distributed), in a multi-cell environment, will identify certain sub-frames where FDC can be enabled. This will be enabled only on specific times to exploit the benefits offered by the FDC only when possible while minimizing any potential performance losses that may occur due to additional interference that may emerge within the system. It may also involve selection of users that will be duplexed in different directions (UL and DL), at the same time, using full duplex communication (FDC). This has to consider the overall system interference and self-interference. The decision to enable (select) FDC in a multi-cell environment depends at least one or some of various factors (to fulfil criteria) such as:

Relative locations of g/eNBs and all the users;
used SINR (or rather the INR) at each receiver; if the INR is high, then a fallback to the legacy frame formatting or SDMA can be used;
Transmit power limitations; transmit power control to minimize the interference;
FDC switching points based on system throughput, outage probability, and/or geographic positions of the users;
Transmit/received power of both UE and g/eNBs;
Application/service/traffic/traffic prediction-priority type;
Traffic prediction;
Degree of traffic asymmetry.

With reference to the outage probabilities, they are similar to the throughput switching points, where the rate in bits/sec will be replaced by outage percentage. The outage means percentage of UEs or resources who do not receive a sufficient SINR.

Regarding the geographical positions, this stores the UE fed back positions and compare the distance between possibly paired UEs to minimum distances subject to full duplex, i.e., "if the distance between two proposed paired UEs' positions is less than (<) a distance_threshold, then do not perform FDC".

Examples introduce novel methods to employ FDC in different scenarios that may include:
Static TDD scenario, in which all the g/eNBs use same pre-determined configuration;

A Cell Specific Dynamic Frame Re-configuration scenario (as explained before);
A with/without multi-connectivity scenario (as depicted in FIG. 3 and FIG. 4);
IoT, MTC (or Machine Communications or M2M), D2D and V2X scenario.

FDC may be enabled on the top of the TDD frame configuration (and description is similarly extendable to FDD frame configuration) for users in urgent need for uplink or downlink transmission. When FDC is enabled (and possibly applicable), the users with ultra-reliable and low-latency communication (URLLC) needs are switched to coexist with mobile-broadband (MBB) users and/or URLLC users. The users are allowed to be duplexed with other users in opposite duplexing direction, for example, in one of the following cases:

If low latency users are in urgent need to communicate during congestion time of one (or more g/eNB); the g/eNB (or the g/eNBs-coordinator) will allocate, based on FDC, UL/DL together with another user sending in the opposite direction.

The g/eNB (or the g/eNBs-coordinator) may carefully select the users which will be using the same subframe (in opposite directions) to be separated enough (far from each other) in order to reduce the inter-user interference. The g/eNB (or the g/eNBs-coordinator) will analyze all the positioning and zonal information of all users and cluster all the possible users in a way to be able to pair users (from geographically separated clusters) on the same subframe using FDC. See FIG. 3 (without multi-connectivity scenario) and FIG. 4 (with multi-connectivity scenario).

Once the g/eNB decided to duplex certain users using FDC, an appropriate signaling is sent to the users' equipment (UEs) informing them about the FDC switching control information. Additionally, each UE may signal the g/eNB with the following information:
i. UE Priority type: URLLC, eMBB, and/or
ii. UE Traffic priority, predicted traffic priority; and/or
iii. UE zonal and positioning information Based on the previous information, the g/eNB (or the g/eNBs-coordinator) execute the FDC_Enabling_Function (see pseudo-code above) to get a decision and switching information for requesting UE.

The g/eNB (or the g/eNBs-coordinator) is flexible to duplex users using FDC if they are URLLC and/or eMBB UEs. Additionally, the g/eNB (or the g/eNB s-coordinator) is flexible to select the subframes to coexist UL/DL in FDC manner despite the traffic load and/or the TDD frame configurations selected at each g/eNB. g/eNB (or the g/eNB s-coordinator) is also flexible to duplex users inside their cells or located on the cell edge of a neighboring cell with another user located anywhere being far with at least the minimum separation distance. The g/eNB (or the g/eNB s-coordinator) can compute possible zonal locations (which are pairable) or adapting it based on the UE traffic load.

Based on the user Priority type, Traffic priority, and UE zonal and positioning information, the new FDC_Enabling_Function (located at the g/eNB or the g/eNB s-coordinator) decides (87) to switch some/all users to FDC communication based on the following:
i. If there is a UE pair separated enough (with a minimum separation distance) to reduce the mutual UE-UE interference on the FDC frames; and/or
ii. If the system throughput will increase compared to legacy TDD/FDD and/or spatial multiplexing in TDD/FDD. For this, the channel covariance matrix may be analyzed in order to decide for FDC. The system throughput switching points can be saved and stored in a lookup table;

Once all signaling triggered by UE is received by the BS, such as an g/eNB (or the g/eNB s-coordinator), it starts deciding on allocating UEs to FDC/TDD/FDD. The switching information is a decision from the g/eNB considering:
  i. URLLC communication coexistence with eMBB. Hence, the UEs have to signal their priority type {URLLC, eMBB}. Based on these priorities, URLLC users are selected to duplexed with FDC with the best matching user pair from eMBB UEs
  ii. The g/eNB is flexible to select UL or DL eMBB directions to coexist URLLC devices using FDC duplexing (see FIG. 3 and FIG. 4 for more information about user switching with/without multi-connectivity)
  iii. Any subframe for TDD/FDD (either UL or DL), can be reused on the user direction once the right UE pairs are found For Device-to-Device (D2D) and/or vehicular-to-vehicular (V2V) communication, in case of congested D2D/V2V resource pool, the g/eNB signals the URLLC devices to deploy FDC and duplex UL/DL in the same subframe. Hence, only pair satisfying the maximum pair separation (for direct communication) can be signaled to be assigned to FDC subframe (an example of FDC enabling function is provided in the pseudocode reported above).

Once the g/eNB rejects FDC mode, or has a fallback to legacy 3GPP TDD/FDD frame reconfigurations, the FDC enabler function may be bypassed as in following flowchart in FIG. 9B.

With reference to the lookup table, it may be such that each row corresponds to a condition and each column corresponds to a particular number of UEs (e.g., from a minimum number to a maximum number of UEs). Each entry of the lookup table may contain a measurement (e.g., an average measurement) and/or estimation associated to the throughput for the particular number of UEs and the particular condition (the roles of columns and rows may be exchanged with each other). The lookup table may be updated in real time and may give information regarding the computed throughput under normal operation without FDC, hence giving the possibility of deciding whether to select FDC or not. For example, a throughput (e.g., total throughput) with FDC may be compared with the total throughput without FDC (for example, with an additional A which may be a percentage or a metrics, hence determining a threshold, A being selected to verify certain QoS) to decide whether to start FDC or not. For example, if the throughput with FDC is greater or equal (≥) than the throughput without FDC+Δ, then it may be chosen to switch to FDC (e.g., at 87). A lookup table may be prepared for UL and a lookup table may be prepared for DL.

In accordance to examples, the following assumptions may be set out:
  Relative locations of g/eNBs and all the users;
  used SINR (or rather the INR) at each receiver; if the INR is high, then a fallback to the legacy frame formatting or SDMA can be used;
  Transmit power limitations;
  transmit power control to minimize the interference;

Interference:
  i. Self-interference at the base-station; handled by the g/eNB self-interference mitigation mechanisms; and/or
  ii. Intra-cell UE-to-UE: which will be reduced using wider distance for FDC enabled UEs
Self-interference at the base-station; handled by the g/eNB self-interference mitigation mechanisms;
Intra-cell UE-to-UE: which will be reduced using wider distance for FDC enabled UEs;

The proposed idea is certainly independent of the used radio access technology (RAT) or the radio frequency band;

This invention is also independent of the network architecture and the deployment scenarios.

Examples may be based on at least one of the following features:
  Users may be selected to reuse same resource blocks for UL/DL simultaneously allowing FDC. The users are selected such that they are sufficiently separated on the cell site field, i.e., satisfying a minimum separation distance.
  Users on cell edges can enjoy dual connectivity mixing different duplex directions among neighboring cells. Where the base stations; based on point above, are still allowed to reuse same resources (in opposite directions) with sufficiently far users.
  The g/eNB s (or a coordinator g/eNB or a cloud RAN units) has to perform, based on users' geographical locations, available beamforming techniques, and capacity, correct switching between FDC and legacy TDD
  If FDC is not possible for cell edge users, a fallback to virtual frame is possible.
  Base stations can provision FDC/TDD switching offline based on traffic maps and cellular/network deployment.

Examples above may be applied in Latency-constrained (mission-critical) communication services, Multilevel QoS services, Narrow-band IoT devices, mMTC, ultra-reliable communication, enhanced Multiple access (MA) scheme and MAC channels.

Further Embodiments

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier.

In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

Equal or equivalent elements or elements with equal or equivalent functionality are denoted in the following description by equal or equivalent reference numerals even if occurring in different figures.

LIST OF ACRONYMS

| | |
|---|---|
| eNB | Evolved Node B (3G base station) |
| LTE | Long-Term Evolution |
| UE | User Equipment (User Terminal) |
| TDD | Time Division Duplex |
| FDD | Frequency Division Duplex |
| UL | Uplink |
| DL | Downlink |
| URLLC | Ultra-reliable Low-latency Communications |
| RAT | Radio Access Technology |
| QoS | Quality of Service |
| URLLC | ultra-reliable and low latency communications |
| MA | Multiple access |

REFERENCES

Patent documents

| | |
|---|---|
| [1] | Method for resource management in a TDD cellular communication network and resource management system (NEC-Corporation) US Pat. No. 9,485,799 B2 |
| [2] | Method for allowing user equipment (UE) to perform UE-flexible time division duplex (TDD) mode communication in network configured to support UE-flexible TDD mode in which base station (BS) operates in full duplex mode and UE operates in half duplex mode, and the user equipment (UE) for the same (LG Electronics) WO2016/006779 |
| [3] | Half-duplex/full-duplex operation for TDD carrier aggregation (Qualcomm) U.S. Pat. No. 9,131,524 B2 |

Academic Papers

| | |
|---|---|
| [4] | S. Goyal, C. Galiotto, N. Marchetti, and S. Panwar, "Throughput and coverage for a mixed full and half duplex small cell network," 2016 IEEE International Conference on Communications (ICC), pp. 1-7, May 2016 |

The invention claimed is:

1. A method comprising:
pairing a first user equipment; (UE) or a first group of UEs, with a second UE or a second group of UEs; and
defining dedicated resources, for a communication between a base station (BS) and the first and second UEs or the first and second groups, so as to full-duplex an uplink (UL) direction, from the first UE or group to the BS, and a downlink (DL) direction, from the BS to the second UE or group, or vice versa, the method further comprising:
identifying the dedicated resources and/or selecting the first and second UEs or groups from a plurality of UEs or groups on a basis of assigned priority values, so as to selectively increase the uplink and/or downlink dedicated resources for higher priority communications.

2. A base station (BS) configured to:
use dedicated resources to perform communications, simultaneously, in uplink (UL) with a first user equipment (UE) or first cluster of UEs, and in downlink (DL) with a second UE or second cluster of UEs; and
identify the dedicated resources and/or select the first and second UEs or clusters from a plurality of UEs or groups on a basis of assigned priority values, so as to selectively increase the uplink and/or downlink dedicated resources for higher priority communications.

3. A user equipment; (UE) for performing uplink and downlink operations, the UE being configured for:
coupling with a counterpart UE, or a group of counterpart UEs for a full duplex communication (FDC) with a base station (BS); and
performing uplink operations while the counterpart UE or group is performing downlink operations in correspondence of dedicated resources,
wherein the UE is configured to receive from the BS a signalling identifying the dedicated resources and/or selecting the first and second UEs or groups from a plurality of UEs or groups on a basis of assigned priority values, so as to selectively increase the uplink and/or downlink dedicated resources for higher priority communications.

* * * * *